(12) United States Patent
Lim

(10) Patent No.: US 12,517,599 B2
(45) Date of Patent: Jan. 6, 2026

(54) PEN AND DISPLAY DEVICE INCLUDING THE SAME

(71) Applicant: SAMSUNG DISPLAY CO., LTD., Yongin-si (KR)

(72) Inventor: Sanghyun Lim, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/365,076

(22) Filed: Aug. 3, 2023

(65) Prior Publication Data

US 2024/0143098 A1 May 2, 2024

(30) Foreign Application Priority Data

Oct. 31, 2022 (KR) .................. 10-2022-0142838

(51) Int. Cl.
*G06F 3/041* (2006.01)
*G06F 1/16* (2006.01)
*G06F 3/0354* (2013.01)
*G06F 3/044* (2006.01)

(52) U.S. Cl.
CPC .......... *G06F 3/0412* (2013.01); *G06F 1/1652* (2013.01); *G06F 3/03545* (2013.01); *G06F 3/0446* (2019.05)

(58) Field of Classification Search
CPC .. G06F 3/0412; G06F 1/1652; G06F 3/03545; G06F 3/0446; G06F 3/0442; G06F 3/046; G06F 3/04162; G06F 3/04164; G06F 3/04166; G06F 3/14; G06F 3/041; G06F 3/044; G06F 3/0354; G06F 3/038; G06F 3/0338; G06F 3/0488; G06F 1/16; H01F 1/10; H03H 7/0115; G09G 5/00; H02J 50/12; H02J 50/40; H02J 50/70; H02J 50/90
USPC ................................... 345/156, 173
See application file for complete search history.

(56) References Cited

U.S. PATENT DOCUMENTS

| 4,868,351 A * | 9/1989 | Watanabe ........... G06F 3/03545 |
| | | 178/19.03 |
| 8,674,967 B2 | 3/2014 | Fukushima et al. |
| 10,120,466 B2 | 11/2018 | Park et al. |
| 11,269,468 B2 | 3/2022 | Yamamoto |
| 2015/0097806 A1 * | 4/2015 | Jeong ................. G06F 3/0446 |
| | | 345/174 |
| 2017/0097696 A1 * | 4/2017 | Park ...................... G06F 3/0383 |
| 2022/0091685 A1 * | 3/2022 | Bechstein ............. G06F 3/0383 |
| 2023/0067179 A1 * | 3/2023 | Kim ...................... G06F 3/0446 |
| 2023/0341953 A1 * | 10/2023 | Kim ................... G06F 3/03545 |
| 2025/0156017 A1 * | 5/2025 | Yamamoto ............ G06F 3/0383 |

FOREIGN PATENT DOCUMENTS

| JP | 7053920 | 4/2022 |
| KR | 10-1361501 | 2/2014 |
| KR | 10-2354248 | 1/2022 |

* cited by examiner

*Primary Examiner* — Chanh D Nguyen
*Assistant Examiner* — Nguyen H Truong
(74) *Attorney, Agent, or Firm* — F. CHAU & ASSOCIATES, LLC

(57) ABSTRACT

A display device includes a display panel, an input sensing part disposed on the display panel, and a pen. The pen includes a ferrite core, a coil disposed on an outer perimeter surface of the ferrite core, a capacitor connected to the coil, and a cover conductor covering an outer portion of the coil.

20 Claims, 38 Drawing Sheets

PEN AND DISPLAY DEVICE INCLUDING THE SAME

CROSS-REFERENCE TO RELATED APPLICATIONS

This U.S. non-provisional patent application claims priority under 35 U.S.C. § 119 TO Korean Patent Application No. 10-2022-0142838, filed on Oct. 31, 2022, the disclosure of which is hereby incorporated by reference in its entirety.

TECHNICAL FIELD

Embodiments of the present disclosure relate to a pen and a display device including the same.

DISCUSSION OF RELATED ART

Electronic devices that provide images to a user, such as, for example, a smartphone, a digital camera, a notebook computer, a navigation unit, a smart television, etc., typically include a display device that displays the images. The display device may generate and provide the images to the user through a display screen.

The display device may include a display panel that displays the images, a touch panel disposed on the display panel that senses a touch by, for example, a body part of a user (e.g., a finger), and a digitizer disposed under the display panel that senses a touch by a pen. The digitizer may be implemented in an electromagnetic manner (or an electromagnetic resonance manner).

The digitizer may include a plurality of coils. When the user moves the pen on the display device, the pen may be driven by an alternating current signal that generates an oscillating magnetic field, which induces a signal in the coils. A position of the pen is sensed based on the signal induced to the coils. The digitizer senses a variation in an electromagnetic field, which is caused by the approach of the pen, to locate the pen.

When two input devices, such as the touch panel and the digitizer, are separately employed for the display device, a thickness of the display device is increased.

SUMMARY

Embodiments of the present disclosure provide a display device with a reduced thickness.

Embodiments of the present disclosure provide a display device including a pen with increased sensing accuracy.

Embodiments of the present disclosure provide a display device including a display panel, an input sensing part disposed on the display panel, and a pen. The pen includes a ferrite core, a coil disposed on an outer perimeter surface of the ferrite core, a capacitor connected to the coil, and a cover conductor covering an outer portion of the coil.

Embodiments of the present disclosure provide a pen including a ferrite core, a coil disposed on an outer perimeter surface of the ferrite core, a capacitor connected to the coil, and a cover conductor covering a portion of the coil, in which the cover conductor has an open-loop shape.

Embodiments of the present disclosure provide a display device including a display panel, an input sensing part including a first sensing electrode, a second sensing electrode insulated from the first sensing electrode while crossing the first sensing electrode, a first pen sensing electrode, and a second pen sensing electrode insulated from the first pen sensing electrode while crossing the first pen sensing electrode, and a pen. The pen includes a ferrite core, a coil disposed on an outer perimeter surface of the ferrite core, a capacitor connected to the coil, and a cover conductor covering an outer portion of the coil. The first and second sensing electrodes and the first and second pen sensing electrodes are disposed on the same layer, and the cover conductor has an open-loop shape.

According to embodiments of the present disclosure, as a touch by a body part of a user and a touch by a pen are sensed by the same input sensing part, a single input device rather than two separate input devices, such as a touch panel and a digitizer, may be utilized, and thus, a thickness of the display device may be reduced.

In addition, a variation in inductance of the pen depending on a tilt angle of the pen may be reduced, a sensing accuracy with respect to the pen may be increased, and the pen may be prevented from malfunctioning even when the pen is tilted.

BRIEF DESCRIPTION OF THE DRAWINGS

The above and other features of the present disclosure will become more apparent by describing in detail embodiments thereof with reference to the accompanying drawings, in which.

DETAILED DESCRIPTION

Figure 1:
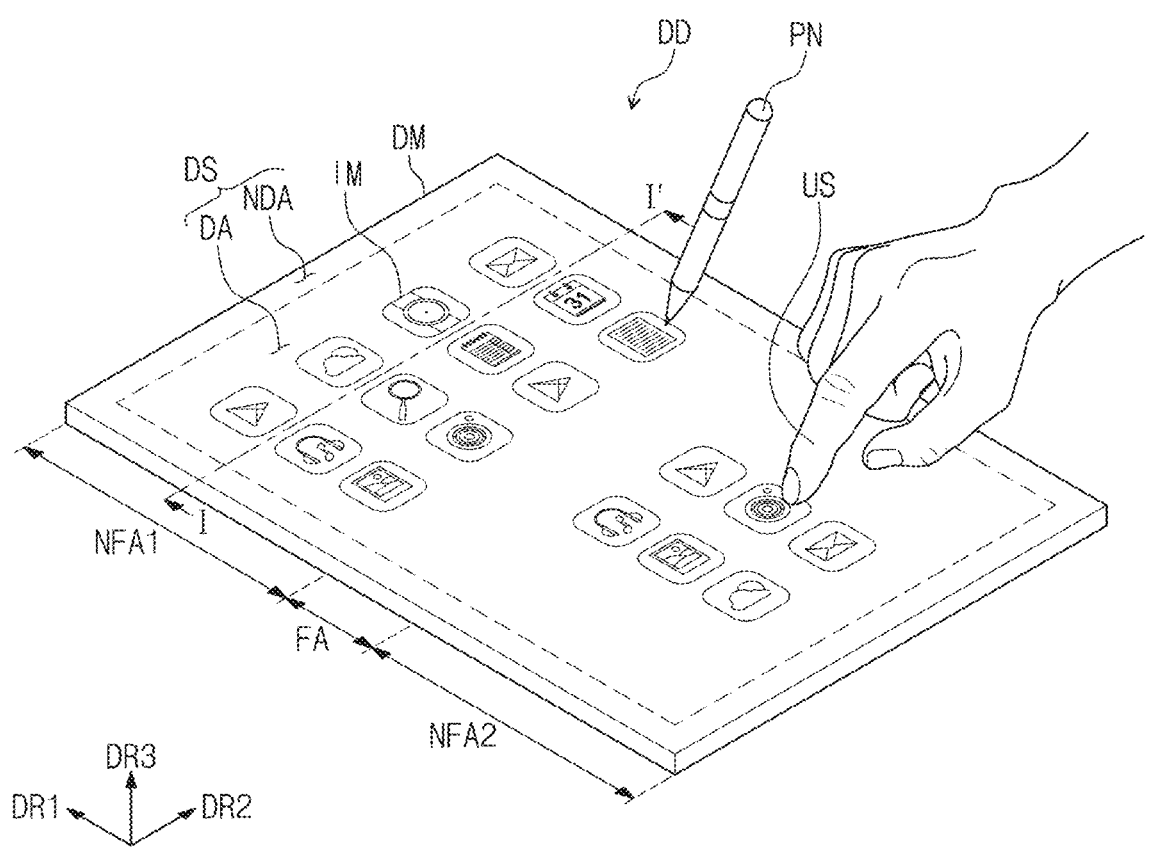
FIG. 1 is a perspective view of a display device according to an embodiment of the present disclosure.

Embodiments of the present disclosure will be described more fully hereinafter with reference to the accompanying drawings. Like reference numerals may refer to like elements throughout the accompanying drawings.

It will be understood that when a component such as a film, a region, a layer, etc., is referred to as being "on", "connected to", "coupled to", or "adjacent to" another component, it can be directly on, connected, coupled, or adjacent to the other component, or intervening components may be present. It will also be understood that when a component is referred to as being "between" two components, it can be the only component between the two components, or one or more intervening components may also be present. It will also be understood that when a component is referred to as "covering" another component, it can be the only component covering the other component, or one or more intervening components may also be covering the other component. Other words used to describe the relationships between components should be interpreted in a like fashion.

As used herein, the term "and/or" may include any and all combinations of one or more of the associated listed items.

It will be understood that the terms "first," "second," "third," etc. are used herein to distinguish one element from another, and the elements are not limited by these terms. Thus, a "first" element in an embodiment may be described as a "second" element in another embodiment.

As used herein, the singular forms, "a", "an" and "the" are intended to include the plural forms as well, unless the context clearly indicates otherwise.

Spatially relative terms, such as "beneath", "below", "lower", "under", "above", "upper", etc., may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below.

It will be further understood that the terms "include" and/or "including", when used in this specification, specify the presence of stated features, integers, steps, operations, elements, and/or components, but do not preclude the presence or addition of one or more other features, integers, steps, operations, elements, components, and/or groups thereof.

Herein, when two or more elements or values are described as being substantially the same as or about equal to each other, it is to be understood that the elements or values are identical to each other, the elements or values are equal to each other within a measurement error, or if measurably unequal, are close enough in value to be functionally equal to each other as would be understood by a person having ordinary skill in the art. For example, the term "about" as used herein is inclusive of the stated value and means within an acceptable range of deviation for the particular value as determined by one of ordinary skill in the art, considering the measurement in question and the error associated with measurement of the particular quantity (e.g., the limitations of the measurement system). For example, "about" may mean within one or more standard deviations as understood by one of the ordinary skill in the art. Further, it is to be understood that while parameters may be described herein as having "about" a certain value, according to embodiments, the parameter may be exactly the certain value or approximately the certain value within a measurement error as would be understood by a person having ordinary skill in the art. Other uses of these terms and similar terms to describe the relationships between components should be interpreted in a like fashion.

It will be further understood that when two components or directions are described as extending substantially parallel or perpendicular to each other, the two components or directions extend exactly parallel or perpendicular to each other, or extend approximately parallel or perpendicular to each other within a measurement error as would be understood by a person having ordinary skill in the art.

Figure 2:
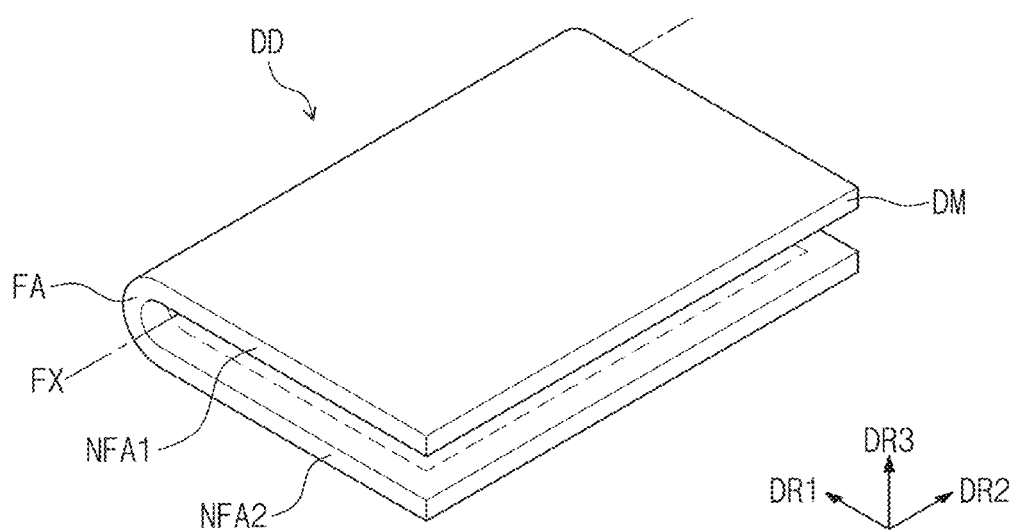
FIG. 2 is a perspective view showing a folded state of the display device shown in FIG. 1 according to an embodiment of the present disclosure.

FIG. 1 is a perspective view of a display device DD according to an embodiment of the present disclosure. FIG. 2 is a perspective view showing a folded state of the display device DD shown in FIG. 1 according to an embodiment of the present disclosure.

Referring to FIG. 1, the display device DD may include a display module DM and a pen PN placed above the display module DM. The display module DM may have a rectangular shape defined by long sides extending in a first direction DR1 and short sides extending in a second direction DR2 crossing the first direction DR1. However, the shape of the display module DM is not limited to the rectangular shape. For example, according to embodiments, the display module DM may have various shapes, such as a circular shape and a polygonal shape. The display module DM may be a flexible display device.

Hereinafter, a direction substantially perpendicular to a plane defined by the first direction DR1 and the second direction DR2 may be referred to as a third direction DR3. In the present disclosure, the expression "when viewed in a plane" may mean a state of being viewed in the third direction DR3.

The display module DM may include a folding area FA and a plurality of non-folding areas NFA1 and NFA2. The non-folding areas NFA1 and NFA2 may include a first non-folding area NFA1 and a second non-folding area NFA2. The folding area FA may be disposed between the first non-folding area NFA1 and the second non-folding area NFA2. The second non-folding area NFA2, the folding area FA, and the first non-folding area NFA1 may be sequentially arranged in the first direction DR1.

An upper surface of the display module DM may be referred to as a display surface DS and may be the plane surface defined by the first direction DR1 and the second direction DR2. Images IM generated by the display module DM may be provided to a user through the display surface DS.

The display surface DS may include a display area DA and a non-display area NDA around the display area DA. The display area DA may display the image, and image is not displayed in the non-display area NDA. The non-display area NDA surrounds the display area DA and defines an edge of the display module DM, which is printed by a predetermined color.

The display module DM may sense inputs applied thereto from the outside of the display module DM. For example, the display module DM may sense a first input generated by a touch of a body part of a user US and a second input generated by the pen PN.

Referring to FIG. 2, the display device DD may be, but is not limited to, a foldable display device DD that is capable of being folded and unfolded. The folding area FA may be folded about a folding axis FX substantially parallel to the second direction DR2, and thus, the display module DM may be folded. The folding axis FX may be defined as a minor axis substantially parallel to the short sides of the display module DM. However, the folding axis FX is not limited thereto. For example, according to an embodiment, the folding axis FX may be defined as a major axis substantially parallel to the long sides of the display module DM, and the display module DM may be folded about the folding axis FX defined as the major axis.

When the display module DM is folded, the display module DM may be inwardly folded (in-folding) such that the first non-folding area NFA1 and the second non-folding area NFA2 face each other and the display surface DS is not exposed (e.g., to the user). However, embodiments of the present disclosure are not limited thereto. According to an embodiment, the display module DM may be outwardly folded (out-folding) such that the display surface DS is exposed (e.g., to the user).

In an embodiment, the foldable display device DD is described as a representative example. However, embodiments of the present disclosure are not limited thereto. For example, according to an embodiment, the display device DD may be a flat display device.

Figure 3:
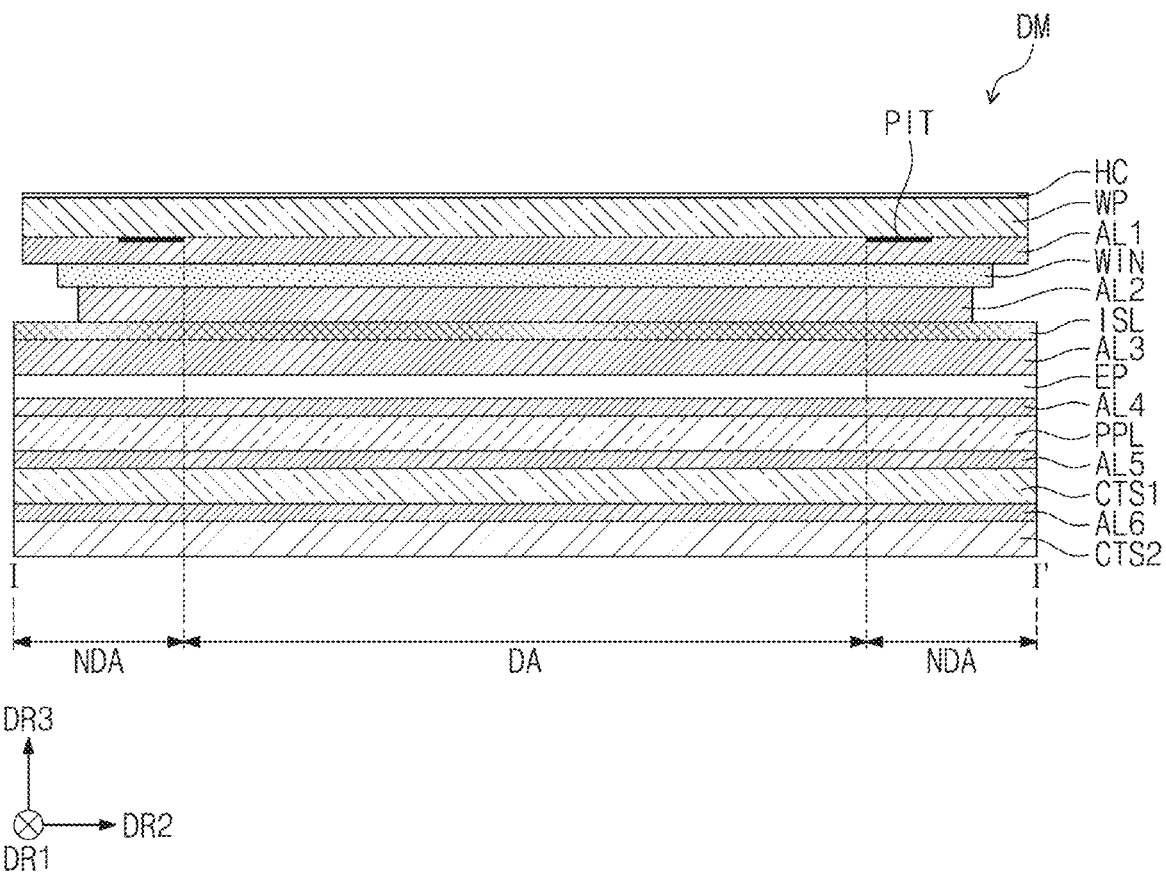
FIG. 3 is a cross-sectional view taken along a line I-I' shown in FIG. 1 according to an embodiment of the present disclosure.

FIG. 3 is a cross-sectional view taken along a line I-I' shown in FIG. 1 according to an embodiment of the present disclosure.

Referring to FIG. 3, the display module DM may include an electronic panel EP, an impact absorbing layer ISL, a panel protective layer PPL, a first conductive sheet CTS1, a second conductive sheet CTS2, a window WIN, a window protective layer WP, a hard coating layer HC, and first, second, third, fourth, fifth, and sixth adhesive layers AL1, AL2, AL3, AL4, AL5, and AL6.

The electronic panel EP may display the images IM, may sense the first and second inputs, and may reduce a reflectance with respect to an external light. The electronic panel EP may include a display panel, an input sensing part, and an anti-reflective layer. Configurations of the electronic panel EP will be described in detail with reference to FIG. 4.

The impact absorbing layer ISL may be disposed on the electronic panel EP. The impact absorbing layer ISL may absorb external impacts applied to the electronic panel EP from above the display device DD and may protect the electronic panel EP. The impact absorbing layer ISL may be manufactured in the form of a stretched film.

The impact absorbing layer ISL may include a flexible plastic material. The flexible plastic material may be defined as a synthetic resin film. As an example, the impact absorbing layer ISL may include the flexible plastic material, such as polyimide (PI) or polyethylene terephthalate (PET).

The panel protective layer PPL may be disposed under the electronic panel EP. The panel protective layer PPL may protect a lower portion of the electronic panel EP. The panel protective layer PPL may include a flexible plastic material. As an example, the panel protective layer PPL may include polyethylene terephthalate (PET).

The first conductive sheet CTS1 may be disposed under the panel protective layer PPL. The second conductive sheet CTS2 may be disposed under the first conductive sheet CTS1. The first conductive sheet CTS1 and the second conductive sheet CTS2 may include a metal material.

The first conductive sheet CTS1 may include a ferromagnetic substance. As an example, the first conductive sheet CTS1 may be defined as a ferrite sheet containing ferrite. The second conductive sheet CTS2 may include a diamagnetic substance. As an example, the second conductive sheet CTS2 may be defined as a copper sheet containing copper. The first and second conductive sheets CTS1 and CTS2 may shield an external magnetic field such that the external magnetic field may be prevented from being applied to the electronic panel EP from a lower side of the display module DM.

The window WIN may be disposed on the impact absorbing layer ISL. The window WIN may protect the electronic panel EP from damage such as, for example, scratches. The window WIN may have an optically transparent property. The window WIN may include a glass material. However, the material of the window WIN is not limited thereto. For example, according to an embodiment, the window WIN may include a synthetic resin film.

The window WIN may have a single-layer or multi-layer structure. As an example, the window WIN may include a plurality of synthetic resin films attached to each other by an adhesive or a glass substrate and a synthetic resin film attached to the glass substrate by an adhesive.

The window protective layer WP may be disposed on the window WIN. The window protective layer WP may include a flexible plastic material, such as, for example, polyimide (PI) or polyethylene terephthalate (PET). The hard coating layer HC may be disposed on the window protective layer WP.

A print layer PIT may be disposed on a lower surface of the window protective layer WP. The print layer PIT may have a black color. However, the color of the print layer PIT is not limited thereto. The print layer PIT may be disposed adjacent to an edge of the window protective layer WP. The print layer PIT may overlap the non-display area NDA.

The first adhesive layer AL1 may be disposed between the window protective layer WP and the window WIN. The window protective layer WP may be attached to the window WIN by the first adhesive layer AL1. The first adhesive layer AL1 may cover the print layer PIT.

The second adhesive layer AL2 may be disposed between the window WIN and the impact absorbing layer ISL. The window WIN may be attached to the impact absorbing layer ISL by the second adhesive layer AL2.

The third adhesive layer AL3 may be disposed between the impact absorbing layer ISL and the electronic panel EP. The impact absorbing layer ISL may be attached to the electronic panel EP by the third adhesive layer AL3.

The fourth adhesive layer AL4 may be disposed between the electronic panel EP and the panel protective layer PPL. The electronic panel EP may be attached to the panel protective layer PPL by the fourth adhesive layer AL4.

The fifth adhesive layer AL5 may be disposed between the panel protective layer PPL and the first conductive sheet CTS1. The panel protective layer PPL may be attached to the first conductive sheet CTS1 by the fifth adhesive layer AL5.

The sixth adhesive layer AL6 may be disposed between the first conductive sheet CTS1 and the second conductive sheet CTS2. The first conductive sheet CTS1 may be attached to the second conductive sheet CTS2 by the sixth adhesive layer AL6.

The first to sixth adhesive layers AL1 to AL6 may include a pressure sensitive adhesive (PSA) or an optically clear adhesive (OCA). However, the first to sixth adhesive layers AL1 to AL6 are not limited thereto.

Figure 4:
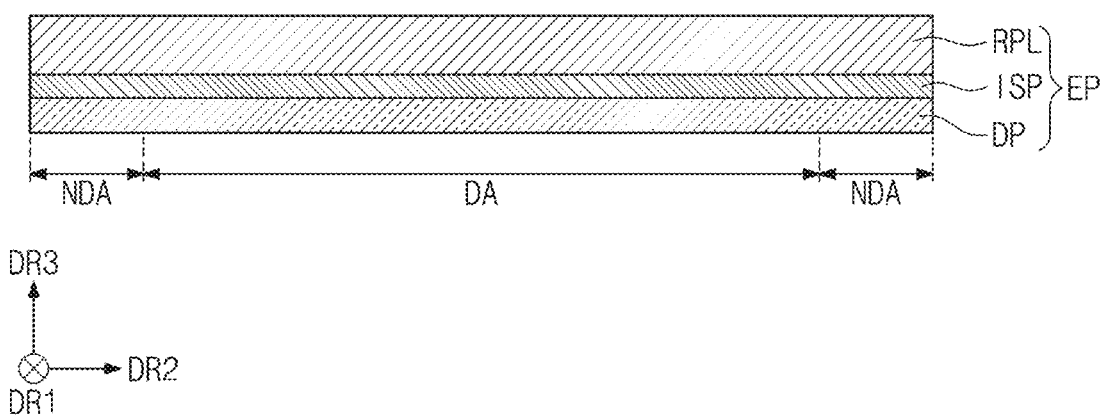
FIG. 4 is a cross-sectional view of an electronic panel shown in FIG. 3 according to an embodiment of the present disclosure.

FIG. 4 is a cross-sectional view of the electronic panel EP shown in FIG. 3 according to an embodiment of the present disclosure.

FIG. 4 shows a cross-section of the electronic panel EP when viewed in the first direction DR1.

Referring to FIG. 4, the electronic panel EP may include the display panel DP, the input sensing part ISP disposed on the display panel DP, and the anti-reflective layer RPL disposed on the input sensing part ISP. The display panel DP may be a flexible display panel. As an example, the display panel DP may include a flexible substrate and a plurality of elements disposed on the flexible substrate.

According to an embodiment, the display panel DP may be a light emitting type display panel. However, the display panel DP is not limited thereto. As an example, the display panel DP may be an organic light emitting display panel or an inorganic light emitting display panel. A light emitting layer of the organic light emitting display panel may include an organic light emitting material. A light emitting layer of the inorganic light emitting display panel may include a quantum dot or a quantum rod. Hereinafter, the organic light emitting display panel will be described as a representative example of the display panel DP.

The input sensing part ISP may include a plurality of sensing electrodes (shown in FIG. 8) to sense the first input by a capacitive manner. The input sensing part ISP may include a plurality of pen sensing electrodes (shown in FIG. 8) to sense the second input by an electromagnetic manner (or an electromagnetic resonance manner). The input sensing part ISP may be directly manufactured on the display panel DP when the electronic panel EP is manufactured.

The anti-reflective layer RPL may be disposed on the input sensing part ISP. The anti-reflective layer RPL may be directly formed on the input sensing part ISP when the electronic panel EP is manufactured. The anti-reflective layer RPL may be defined as an external light reflection prevention film. The anti-reflective layer RPL may reduce a reflectance with respect to the external light incident to the display panel DP from above the display device DD.

As an example, the input sensing part ISP may be disposed directly on the display panel DP, and the anti-reflective layer RPL may be directly formed on the input sensing part ISP. However, embodiments of the present disclosure are not limited thereto. As an example, the input sensing part ISP may be attached to the display panel DP by an adhesive layer after being manufactured separately from the display panel DP, and the anti-reflective layer RPL may be attached to the input sensing part ISP by an adhesive layer after being manufactured separately from the input sensing part ISP.

Figure 5:
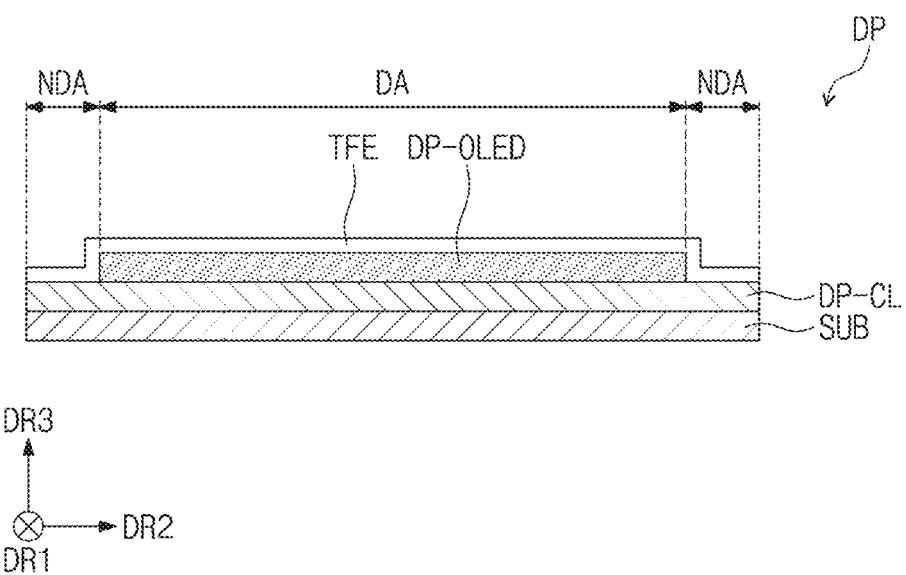
FIG. 5 is a cross-sectional view of a display panel shown in FIG. 4 according to an embodiment of the present disclosure.

FIG. 5 is a cross-sectional view of the display panel DP shown in FIG. 4 according to an embodiment of the present disclosure.

FIG. 5 shows a cross-section of the display panel DP when viewed in the first direction DR1.

Referring to FIG. 5, the display panel DP may include a substrate SUB, a circuit element layer DP-CL disposed on the substrate SUB, a display element layer DP-OLED disposed on the circuit element layer DP-CL, and a thin film encapsulation layer TFE disposed on the display element layer DP-OLED.

The substrate SUB may include a display area DA and a non-display area NDA around the display area DA. The substrate SUB may include a flexible plastic material such as, for example, polyimide (PI). The display element layer DP-OLED may be disposed in the display area DA.

A plurality of pixels may be disposed in the display area DA. Each pixel may include a transistor disposed in the circuit element layer DP-CL and a light emitting element disposed in the display element layer DP-OLED and connected to the transistor.

The thin film encapsulation layer TFE may be disposed on the circuit element layer DP-CL and may cover the display element layer DP-OLED. The thin film encapsulation layer TFE may include inorganic layers and organic layers disposed between the inorganic layers. The inorganic layers may protect the pixels from moisture and oxygen. The organic layers may protect the pixels from a foreign substance such as dust particles.

Figure 6:
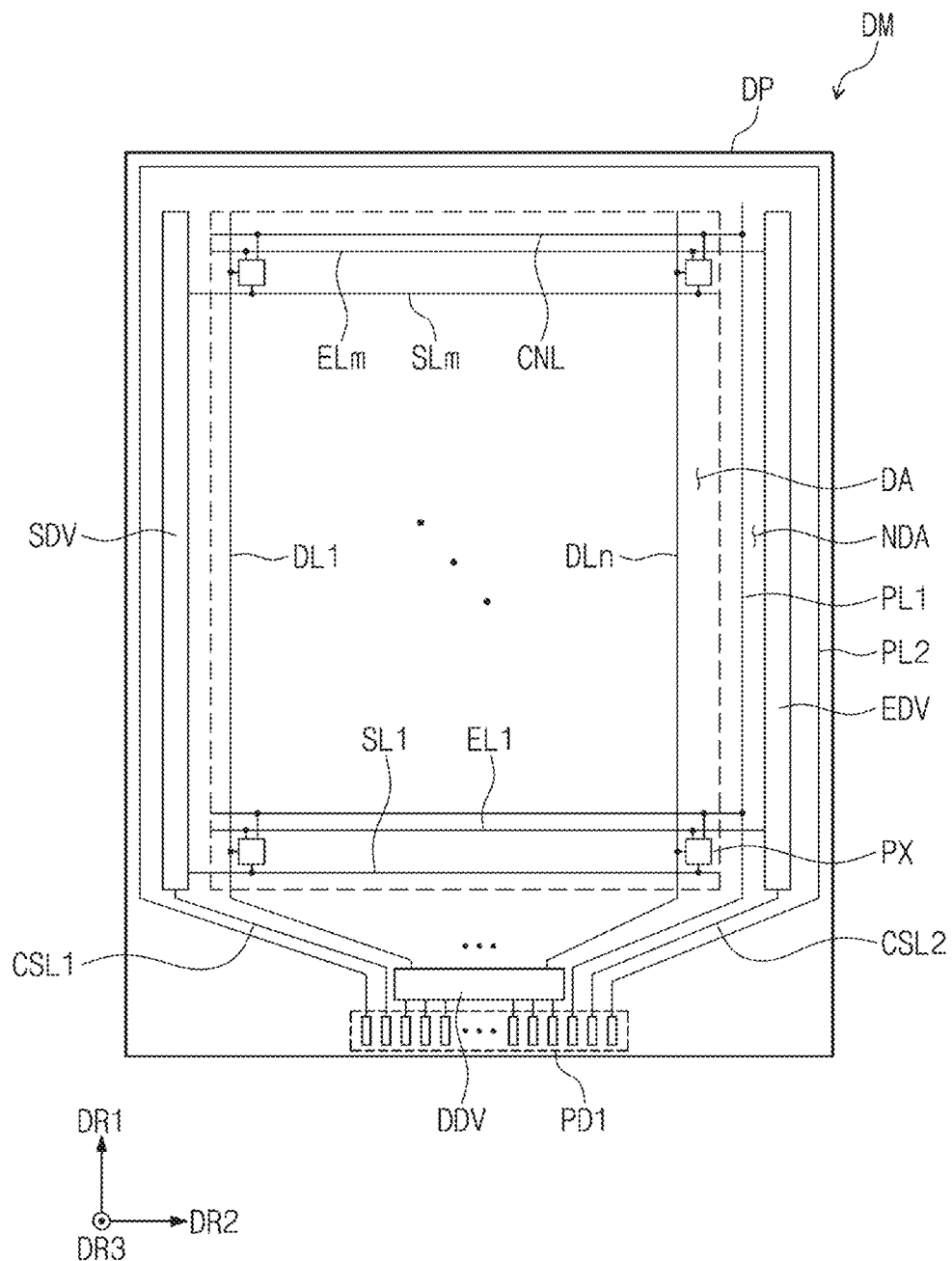
FIG. 6 is a plan view of the display panel shown in FIG. 5 according to an embodiment of the present disclosure.

FIG. 6 is a plan view of the display panel DP shown in FIG. 5 according to an embodiment of the present disclosure.

Referring to FIG. 6, the display module DM may include the display panel DP, a scan driver SDV, a data driver DDV, a light emission driver EDV, and a plurality of first pads PD1.

The display panel DP may have a rectangular shape having long sides extending in the first direction DR1 and short sides extending in the second direction DR2. However, the shape of the display panel DP is not limited thereto. The display panel DP may include the display area DA and the non-display area NDA surrounding the display area DA.

The display panel DP may include a plurality of pixels PX, a plurality of scan lines SL1 to SLm, a plurality of data lines DL1 to DLn, a plurality of light emission lines ELI to ELm, first and second control lines CSL1 and CSL2, first and second power lines PL1 and PL2, and connection lines CNL. Each of "m" and "n" is a positive integer.

The pixels PX may be arranged in the display area DA. The scan driver SDV and the light emission driver EDV may be disposed in the non-display area NDA to be respectively adjacent to the long sides of the display panel DP. The data driver DDV may be disposed in the non-display area NDA to be adjacent to one short side of the short sides of the display panel DP. When viewed in a plane, the data driver DDV may be disposed to be adjacent to a lower end of the display panel DP.

The scan lines SL1 to SLm may extend in the second direction DR2 and may be connected to the pixels PX and the scan driver SDV. The data lines DL1 to DLn may extend in the first direction DR1 and may be connected to the pixels PX and the data driver DDV. The light emission lines EL1 to ELm may extend in the second direction DR2 and may be connected to the pixels PX and the light emission driver EDV.

The first power line PL1 may extend in the first direction DR1 and may be disposed in the non-display area NDA. The first power line PL1 may be disposed between the display area DA and the light emission driver EDV.

The connection lines CNL may extend in the second direction DR2 and may be arranged in the first direction DR1. The connection lines CNL may be connected to the first power line PL1 and the pixels PX. A first voltage may be applied to the pixels PX through the first power line PL1 and the connection lines CNL connected to the first power line PL1.

The second power line PL2 may be disposed in the non-display area NDA. The second power line PL2 may extend along the long sides of the display panel DP and the other short side at which the data driver DDV is not disposed in the display panel DP. The second power line PL2 may be disposed outside the scan driver SDV and the light emission driver EDV.

In an embodiment, the second power line PL2 may extend to the display area DA and may be connected to the pixels PX. A second voltage having a level lower than that of the first voltage may be applied to the pixels PX through the second power line PL2.

The first control line CSL1 may be connected to the scan driver SDV and may extend toward the lower end of the display panel DP. The second control line CSL2 may be connected to the light emission driver EDV and may extend toward the lower end of the display panel DP. The data driver DDV may be disposed between the first control line CSL1 and the second control line CSL2.

The first pads PD1 may be disposed in the non-display area NDA adjacent to the lower end of the display panel DP and may be disposed closer to the lower end of the display panel DP than the data driver DDV is. The data driver DDV, the first power line PL1, the second power line PL2, the first control line CSL1, and the second control line CSL2 may be connected to the first pads PD1. The data lines DL1 to DLn may be connected to the data driver DDV, and the data driver DDV may be connected to the first pads PD1 corresponding to the data lines DL1 to DLn.

In an embodiment, the display device DD may further include a timing controller that controls an operation of the scan driver SDV, the data driver DDV, and the light emission driver EDV, and a voltage generator that generates the first and second voltages. The timing controller and the voltage generator may be connected to the first pads PD1 through a printed circuit board.

The scan driver SDV may generate a plurality of scan signals, and the scan signals may be applied to the pixels PX through the scan lines SL1 to SLm. The data driver DDV may generate a plurality of data voltages, and the data voltages may be applied to the pixels PX through the data lines DL1 to DLn. The light emission driver EDV may generate a plurality of light emission signals, and the light emission signals may be applied to the pixels PX through the light emission lines EL1 to ELm. The pixels PX may receive the data voltages in response to the scan signals. The pixels PX may emit a light having a luminance corresponding to the data voltages in response to the light emission signals, and thus, the image may be displayed.

Figure 7:
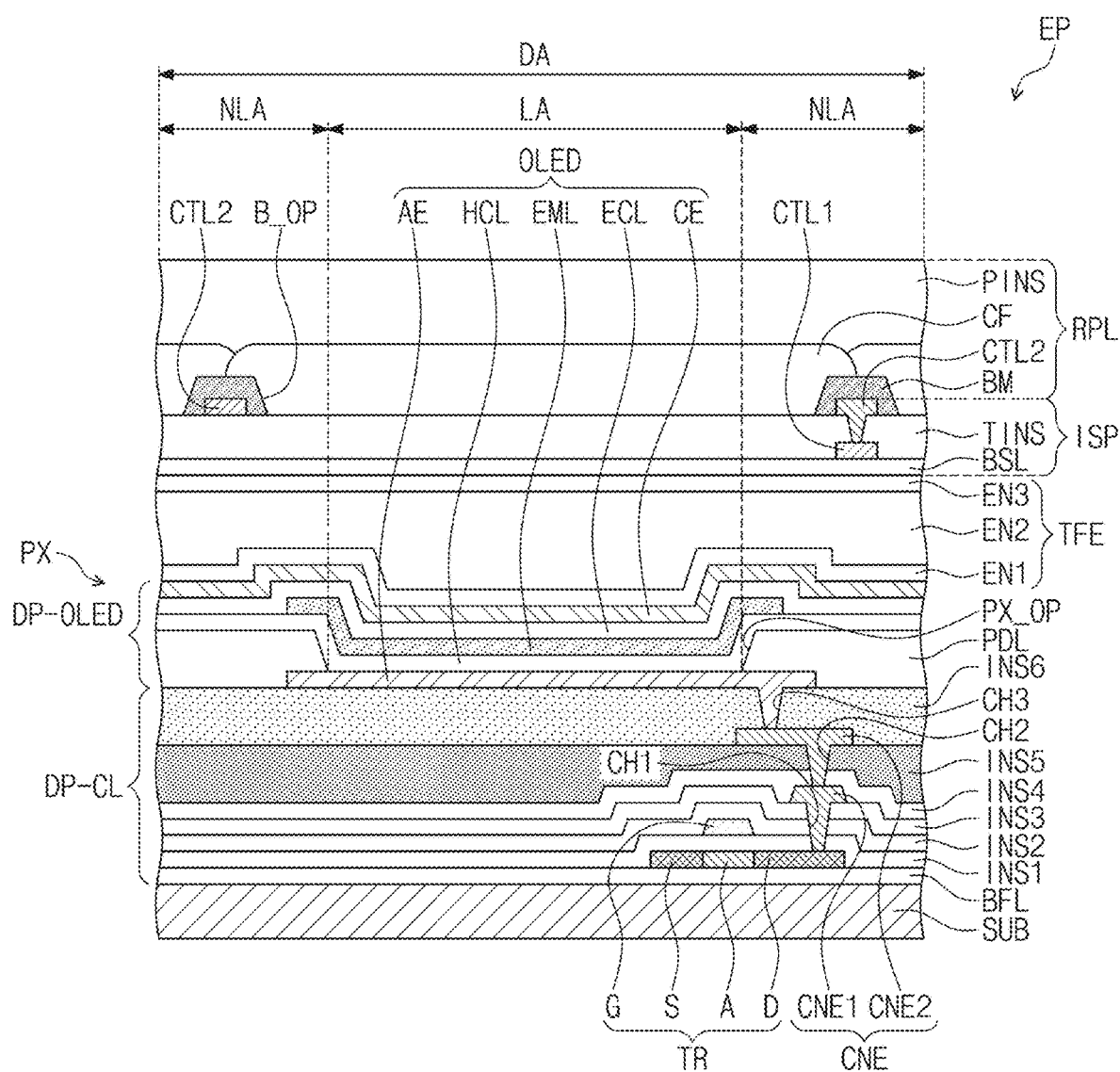
FIG. 7 is a cross-sectional view of an electronic panel corresponding to one pixel shown in FIG. 6 according to an embodiment of the present disclosure.

FIG. 7 is a cross-sectional view of the electronic panel EP corresponding to one pixel shown in FIG. 6 according to an embodiment of the present disclosure.

Referring to FIG. 7, the pixel PX may include a transistor TR and a light emitting element OLED. The light emitting element OLED may include a first electrode AE (or an anode), a second electrode CE (or a cathode), a hole control layer HCL, an electron control layer ECL, and a light emitting layer EML.

The transistor TR and the light emitting element OLED may be disposed on the substrate SUB. As an example, one transistor TR is shown in FIG. 7. However, the pixel PX may include a plurality of transistors and at least one capacitor that drive the light emitting element OLED.

The display area DA may include a light emitting area LA corresponding to each pixel PX and a non-light-emitting area NLA around the light emitting area LA. The light emitting element OLED may be disposed in the light emitting area LA.

A buffer layer BFL may be disposed on the substrate SUB. The buffer layer BFL may be, for example, an inorganic layer. A semiconductor pattern may be disposed on the buffer layer BFL. The semiconductor pattern may include, for example, a polycrystalline silicon, amorphous silicon, or metal oxide.

The semiconductor pattern may be doped with an N-type dopant or a P-type dopant. The semiconductor pattern may include a high-doped region and a low-doped region. The high-doped region may have a conductivity greater than that of the low-doped region and may substantially serve as a source electrode and a drain electrode of the transistor TR. The low-doped region may substantially correspond to an active (or a channel) of the transistor TR.

The source S, the active A, and the drain D of the transistor TR may be formed from the semiconductor pattern. A first insulating layer INS1 may be disposed on the semiconductor pattern. A gate G of the transistor TR may be disposed on the first insulating layer INS1. A second insulating layer INS2 may be disposed on the gate G. A third insulating layer INS3 may be disposed on the second insulating layer INS2.

A connection electrode CNE may include a first connection electrode CNE1 and a second connection electrode CNE2 that connect the transistor TR and the light emitting element OLED. The first connection electrode CNE1 may be disposed on the third insulating layer INS3 and may be connected to the drain D through a first contact hole CH1 defined through the first, second, and third insulating layers INS1, INS2, and INS3.

A fourth insulating layer INS4 may be disposed on the first connection electrode CNE1. A fifth insulating layer INS5 may be disposed on the fourth insulating layer INS4. The second connection electrode CNE2 may be disposed on the fifth insulating layer INS5 and may be connected to the first connection electrode CNE1 through a second contact hole CH2 defined through the fourth and fifth insulating layers INS4 and INS5.

A sixth insulating layer INS6 may be disposed on the second connection electrode CNE2. Layers from the buffer layer BFL to the sixth insulating layer INS6 may be defined as the circuit element layer DP-CL. Each of the first insulating layer INS1 to the sixth insulating layer INS6 may be an inorganic layer or an organic layer.

The first electrode AE may be disposed on the sixth insulating layer INS6. The first electrode AE may be connected to the second connection electrode CNE2 through a third contact hole CH3 defined through the sixth insulating layer INS6. A pixel definition layer PDL may be disposed on the first electrode AE and the sixth insulating layer INS6 to expose a predetermined portion of the first electrode AE. The pixel definition layer PDL may be provided with an opening PX_OP defined therethrough to expose the portion of the first electrode AE.

The hole control layer HCL may be disposed on the first electrode AE and the pixel definition layer PDL. The hole control layer HCL may include a hole transport layer and a hole injection layer.

The light emitting layer EML may be disposed on the hole control layer HCL. The light emitting layer EML may be disposed in an area corresponding to the opening PX_OP. The light emitting layer EML may include an organic material and/or an inorganic material. The light emitting layer EML may generate a light having one of red, green, and blue colors.

The electron control layer ECL may be disposed on the light emitting layer EML and the hole control layer HCL. The electron control layer ECL may include an electron transport layer and an electron injection layer. The hole control layer HCL and the electron control layer ECL may be commonly disposed in the light emitting area LA and the non-light-emitting area NLA.

The second electrode CE may be disposed on the electron control layer ECL. The second electrode CE may be commonly disposed over the pixels PX. Layers forming the light emitting element OLED may be defined as the display element layer DP-OLED.

The thin film encapsulation layer TFE may be disposed on the second electrode CE and may cover the pixel PX. The thin film encapsulation layer TFE may include a first encapsulation layer EN1 disposed on the second electrode CE, a second encapsulation layer EN2 disposed on the first encapsulation layer EN1, and a third encapsulation layer EN3 disposed on the second encapsulation layer EN2.

The first and third encapsulation layers EN1 and EN3 may include an inorganic insulating layer and may protect the pixel PX from moisture and oxygen. The second encapsulation layer EN2 may include an organic insulating layer and may protect the pixel PX from a foreign substance such as dust particles.

The first voltage may be applied to the first electrode AE via the transistor TR, and the second voltage having a voltage level lower than that of the first voltage may be applied to the second electrode CE. Holes and electrons injected into the light emitting layer EML may be recombined to generate excitons, and the light emitting element OLED may emit the light by the excitons that return to a ground state from an excited state.

The input sensing part ISP may be disposed on the thin film encapsulation layer TFE. The input sensing part ISP may be directly manufactured on an upper surface of the thin film encapsulation layer TFE.

A base layer BSL may be disposed on the thin film encapsulation layer TFE. The base layer BSL may include an inorganic insulating layer. At least one inorganic insulating layer may be provided on the thin film encapsulation layer TFE as the base layer BSL.

The input sensing part ISP may include a first conductive pattern CTL1 and a second conductive pattern CTL2 disposed on the first conductive pattern CTL1. The first conductive pattern CTL1 may be disposed on the base layer BSL. An insulating layer TINS may be disposed on the base layer BSL and may cover the first conductive pattern CTL1. The insulating layer TINS may include an inorganic insulating layer or an organic insulating layer. The second conductive pattern CTL2 may be disposed on the insulating layer TINS.

The first and second conductive patterns CTL1 and CTL2 may overlap the non-light-emitting area NLA. In an embodiment, the first and second conductive patterns CTL1 and CTL2 may be disposed in the non-light-emitting area NLA between the light emitting areas LA and may have a mesh shape.

The first and second conductive patterns CTL1 and CTL2 may form the sensing electrodes and the pen sensing electrodes of the input sensing part ISP. As an example, the first and second conductive patterns CTL1 and CTL2 having the mesh shape may be separated from each other in a predetermined area to form the sensing electrodes and the pen sensing electrodes. A portion of the second conductive pattern CTL2 may be connected to the first conductive pattern CTL1.

The anti-reflective layer RPL may be disposed on the second conductive pattern CTL2. The anti-reflective layer RPL may include a black matrix BM and a plurality of color filters CF. The black matrix BM may overlap the non-light-emitting area NLA, and the color filters CF may overlap the light emitting areas LA, respectively.

The black matrix BM may be disposed on the insulating layer TINS and may cover the second conductive pattern CTL2. The black matrix BM may be provided with an opening B_OP defined therethrough to overlap the light emitting area LA and the opening PX_OP. The black matrix BM may absorb and block the light. A width of the opening B_OP may be greater than a width of the opening PX_OP.

The color filters CF may be disposed on the insulating layer TINS and the black matrix BM. The color filters CF may be disposed in the openings B_OP, respectively. A planarization insulating layer PINS may be disposed on the color filters CF. The planarization insulating layer PINS may provide a flat upper surface. The planarization insulating layer PINS may include an organic insulating layer.

In a case in which the external light incident to the display panel DP is provided to the user after being reflected by the display panel DP (e.g., like a mirror), the user may perceive the external light. The anti-reflective layer RPL may include the color filters CF that display the same colors as those of the pixels, which may prevent the above-described phenomenon. The color filters CF may filter the external light such that the external light may have the same color as the pixels. In this case, the external light may not be perceived by the user.

Figure 8:
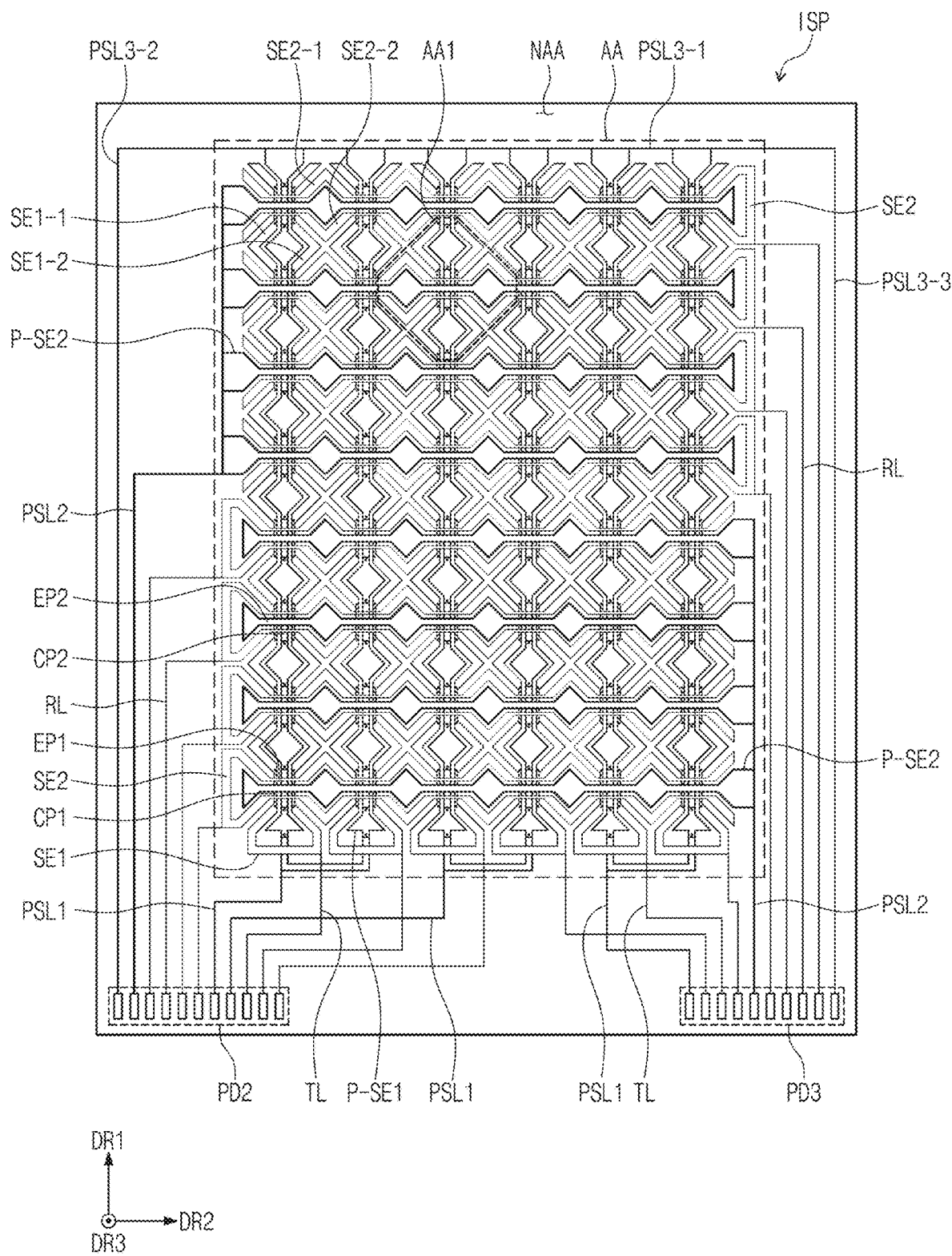
FIG. 8 is a plan view of an input sensing part shown in FIG. 4 according to an embodiment of the present disclosure.

FIG. 8 is a plan view of the input sensing part ISP shown in FIG. 4 according to an embodiment of the present disclosure.

Referring to FIG. 8, the input sensing part ISP may include a plurality of sensing electrodes SE1 and SE2, a plurality of sensing lines TL and RL, a plurality of pen sensing electrodes P-SE1 and P-SE2, a plurality of pen sensing lines PSL1, PSL2, and PSL3-1 to PSL3-3, and a plurality of second and third pads PD2 and PD3. The sensing electrodes SE1 and SE2, the sensing lines TL and RL, the pen sensing electrodes P-SE1 and P-SE2, the pen sensing lines PSL1, PSL2, and PSL3-1 to PSL3-3, and the second and third pads PD2 and PD3 may be disposed on the thin film encapsulation layer TFE.

A plane area of the input sensing part ISP may include an active area AA and a non-active area NAA around the active area AA. When viewed in the plane, the active area AA may overlap the display area DA, and the non-active area NAA may overlap the non-display area NDA.

The sensing electrodes SE1 and SE2 may be arranged in the active area AA, and the second and third pads PD2 and PD3 may be arranged in the non-active area NAA. The second pads PD2 and the third pads PD3 may be arranged adjacent to a lower end of the input sensing part ISP when viewed in the plane.

As an example, the second pads PD2 may be arranged adjacent to a left side of the input sensing part ISP, and the third pads PD3 may be arranged adjacent to a right side of the input sensing part ISP. When viewed in the plane, the first pads PD1 shown in FIG. 6 may be disposed between the second pads PD2 and the third pads PD3.

The sensing electrodes SE1 and SE2 may include a plurality of first sensing electrodes SE1 extending in the first direction DR1 and arranged in the second direction DR2 and a plurality of second sensing electrodes SE2 extending in the second direction DR2 and arranged in the first direction DR1. The second sensing electrodes SE2 may extend to be insulated from the first sensing electrodes SE1 while crossing the first sensing electrodes SE1. The first and second sensing electrodes SE1 and SE2 may be used to sense the first input.

The sensing lines TL and RL may be connected to one of the ends of the first and second sensing electrodes SE1 and SE2, may extend in the non-active area NAA, and may be connected to the second and third pads PD2 and PD3. The sensing lines TL and RL may include a plurality of first sensing lines TL connected to the first sensing electrodes SE1 and a plurality of second sensing lines RL connected to the second sensing electrodes SE2.

The first sensing lines TL may be connected to lower ends of the first sensing electrodes SE1. The first sensing lines TL may extend to the non-active area NAA and may be connected to corresponding second and third pads PD2 and PD3.

The input sensing part ISP may be divided into a left portion and a right portion with respect to a center in the second direction DR2. The first sensing lines TL connected to the first sensing electrodes SE1 disposed in the left portion may be connected to the corresponding second pads PD2. The first sensing lines TL connected to the first sensing electrodes SE1 disposed in the right portion may be connected to corresponding third pads PD3.

The second sensing lines RL may be connected to left ends or right ends of the second sensing electrodes SE2. The second sensing lines RL may extend to the non-active area NAA and may be connected to the corresponding second and third pads PD2 and PD3.

The input sensing part ISP may be divided into a lower portion and an upper portion with respect to a center in the first direction DR1. The second sensing lines RL arranged in the lower portion of the input sensing part ISP may be connected to the left ends of the second sensing electrodes SE2 arranged in the lower portion of the input sensing part ISP. The second sensing lines RL arranged in the upper portion of the input sensing part ISP may be connected to the right ends of the second sensing electrodes SE2 arranged in the upper portion of the input sensing part ISP.

The second sensing lines RL arranged in the lower portion of the input sensing part ISP may be connected to the corresponding second pads PD2. The second sensing lines RL arranged in the upper portion of the input sensing part ISP may be connected to the corresponding third pads PD3.

Each of the first sensing electrodes SE1 may include a first-first sensing electrode SE1-1 and a first-second sensing electrode SE1-2, which extend in the first direction DR1 and are spaced apart from each other in the second direction DR2. The first-first sensing electrode SE1-1 and the first-second sensing electrode SE1-2 may be substantially symmetrical with respect to the second direction DR2.

In each of the first sensing electrodes SE1, a lower end of the first-first sensing electrode SE1-1 and a lower end of the first-second sensing electrode SE1-2 may be connected to corresponding first sensing lines TL among the first sensing lines TL. In an embodiment, in each of the first sensing electrodes SE1, an upper end of the first-first sensing electrode SE1-1 and an upper end of the first-second sensing electrode SE1-2 are not connected to each other.

Each of the second sensing electrodes SE2 may include a second-first sensing electrode SE2-1 and a second-second sensing electrode SE2-2, which extend in the second direction DR2 and are spaced apart from each other in the first direction DR1. The second-first sensing electrode SE2-1 and the second-second sensing electrode SE2-2 may be substantially symmetrical with respect to the first direction DR1.

In each of the second sensing electrodes SE2 arranged in the lower portion of the input sensing part ISP, a left end of the second-first sensing electrode SE2-1 and a left end of the second-second sensing electrode SE2-2 may be connected to corresponding second sensing lines RL among the second sensing lines RL. In an embodiment, in each of the second sensing electrodes SE2 arranged in the lower portion of the input sensing part ISP, a right end of the second-first sensing electrode SE2-1 and a right end of the second-second sensing electrode SE2-2 are not connected to each other.

In each of the second sensing electrodes SE2 arranged in the upper portion of the input sensing part ISP, a right end of the second-first sensing electrode SE2-1 and a right end of the second-second sensing electrode SE2-2 may be connected to corresponding second sensing lines RL among the second sensing lines RL. In an embodiment, in each of the second sensing electrodes SE2 arranged in the upper portion of the input sensing part ISP, a left end of the second-first sensing electrode SE2-1 and a left end of the second-second sensing electrode SE2-2 are not connected to each other.

As an example, when viewed in the plane, the first sensing lines TL may be arranged in the non-active area NAA adjacent to a lower side of the active area AA. In addition, when viewed in the plane, the second sensing lines RL may be arranged in the non-active area NAA adjacent to left and right sides of the active area AA.

The pen sensing electrodes P-SE1 and P-SE2 may be arranged in the active area AA. The pen sensing lines PSL1, PSL2, and PSL3-1 to PSL3-3 may be connected to the pen sensing electrodes P-SE1 and P-SE2, may extend to the non-active area, and may be connected to corresponding second and third pads PD2 and PD3.

In an embodiment, a sensing IC that controls the input sensing part ISP may be connected to the second and third pads PD2 and PD3 via the printed circuit board.

The pen sensing electrodes P-SE1 and P-SE2 may include a plurality of first pen sensing electrodes P-SE1 extending in the first direction DR1 and arranged in the second direction DR2 and a plurality of second pen sensing electrodes P-SE2 extending in the second direction DR2 and arranged in the first direction DR1. The first and second pen sensing electrodes P-SE1 and P-SE2 may be used to sense the second input.

The second pen sensing electrodes P-SE2 may extend to cross the first pen sensing electrodes P-SE1 and may be insulated from the first pen sensing electrodes P-SE1. The first pen sensing electrodes P-SE1 may extend to cross the second sensing electrodes SE2 and may be insulated from the second sensing electrodes SE2. The second pen sensing electrodes P-SE2 may extend to cross the first sensing electrodes SE1 and may be insulated from the first sensing electrodes SE1.

Each of the first pen sensing electrodes P-SE1 may be disposed between the first-first sensing electrode SE1-1 and the first-second sensing electrode SE1-2 of the corresponding first sensing electrode SE1 among the first sensing electrodes SE1. Each of the second pen sensing electrodes P-SE2 may be disposed between the second-first sensing electrode SE2-1 and the second-second sensing electrode SE2-2 of the corresponding second sensing electrode SE2 among the second sensing electrodes SE2.

The first pen sensing electrodes P-SE1 and the first sensing electrodes SE1 may be disposed on the same layer. The second pen sensing electrodes P-SE2 and the second sensing electrodes SE2 may be disposed on the same layer. The first pen sensing electrodes P-SE1, the first sensing electrodes SE1, the second pen sensing electrodes P-SE2, and the second sensing electrodes SE2 may be disposed on the same layer.

Upper ends of the first pen sensing electrodes P-SE1 may be connected to each other. Lower ends of the first pen sensing electrodes P-SE1 may be connected to each other in pairs. Left ends of the second pen sensing electrodes P-SE2, which are disposed at the upper portion of the input sensing part ISP, may be connected to each other. Right ends of the second pen sensing electrodes P-SE2, which are disposed at the lower portion of the input sensing part ISP, may be connected to each other.

In an embodiment, right ends of the second pen sensing electrodes P-SE2, which are disposed at the upper portion of the input sensing part ISP, are not connected to each other. In an embodiment, left ends of the second pen sensing electrodes P-SE2, which are disposed at the lower portion of the input sensing part ISP, are not connected to each other.

The pen sensing lines PSL1, PSL2, and PSL3-1 to PSL3-3 may include a plurality of first pen sensing lines PSL1, a plurality of second pen sensing lines PSL2, and a plurality of third-first, third-second, and third-third pen sensing lines PSL3-1, PSL3-2, and PSL3-3. The first pen sensing lines PSL1 and the third-first, third-second, and third-third pen sensing lines PSL3-1, PSL3-2, and PSL3-3 may be connected to the first pen sensing electrodes P-SE1. The second pen sensing lines PSL2 may be connected to the second pen sensing electrodes P-SE2.

The pair of the first pen sensing electrodes P-SE1 whose lower ends are connected to each other may be connected to a corresponding first pen sensing line PSL1 among the first pen sensing lines PSL1. The upper ends of the first pen sensing electrodes P-SE1 may be connected to the third-first pen sensing line PSL3-1 extending in the second direction DR2.

The third-second pen sensing line PSL3-2 and the third-third pen sensing line PSL3-3 may extend from both ends of the third-first pen sensing line PSL3-1 in the first direction DR1. The third-second pen sensing line PSL3-2 may be disposed at the left side of the input sensing part ISP and may be connected to a corresponding second pad PD2. The third-third pen sensing line PSL3-3 may be disposed at the right side of the input sensing part ISP and may be connected to a corresponding third pad PD3.

The left ends of the second pen sensing electrodes P-SE2, which are disposed at the upper portion of the input sensing part ISP, may be connected to a corresponding second pen sensing line PSL2 among the second pen sensing lines PSL2. The second pen sensing line PSL2 connected to the second pen sensing electrodes P-SE2 disposed at the upper portion of the input sensing part ISP may be connected to a corresponding second pad PD2.

The right ends of the second pen sensing electrodes P-SE2, which are disposed at the lower portion of the input sensing part ISP, may be connected to a corresponding second pen sensing line PSL2 among the second pen sensing lines PSL2. The second pen sensing line PSL2 connected to the second pen sensing electrodes P-SE2 disposed at the lower portion of the input sensing part ISP may be connected to a corresponding third pad PD3.

In an embodiment, the input sensing part ISP may be driven in a time-division manner for a first sensing period and a second sensing period. The first sensing period and the second sensing period may be repeated. The first and second sensing electrodes SE1 and SE2 may be driven for the first sensing period to sense a touch generated by the body part of the user US. During the second sensing period, a touch generated by the pen PN may be sensed by the first and second pen sensing electrodes P-SE1 and P-SE2. An operation that senses the touch generated by the pen PN will be described in detail below.

Since the touch by the body part of the user US and the touch by the pen PN are performed in the same input sensing part ISP, two input devices, such as a touch panel and a digitizer, may be omitted, and thus, a thickness of the display device DD may be reduced.

As an example, six first pen sensing electrodes P-SE1 and eight second pen sensing electrodes P-SE2 are shown. However, embodiments of the present disclosure are not limited thereto. For example, in an embodiment, the input sensing part ISP may include more than six first pen sensing electrodes P-SE1 and more than eight second pen sensing electrodes P-SE2.

Figure 9:
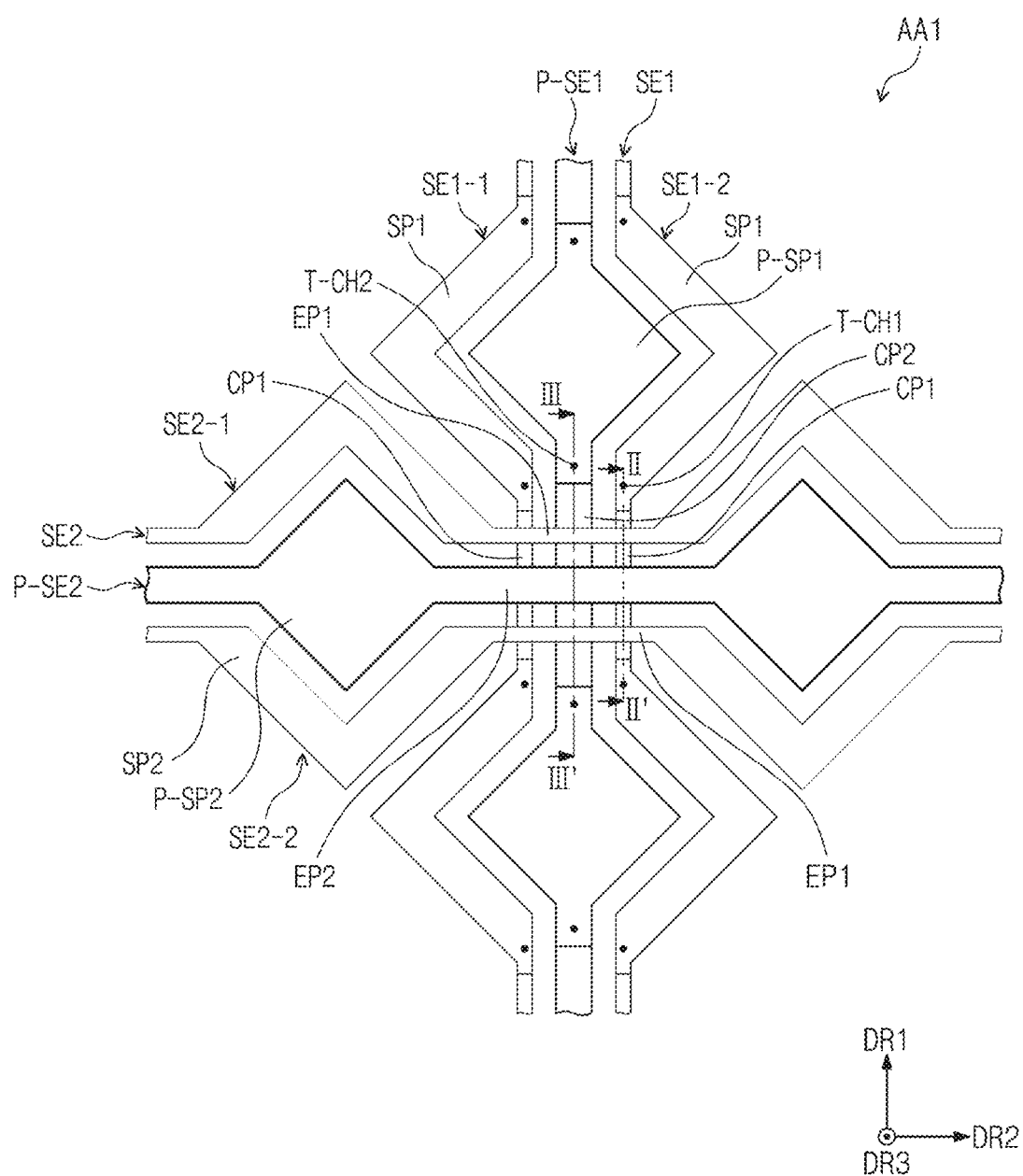
FIG. 9 is an enlarged view of a first area AA1 shown in FIG. 8 according to an embodiment of the present disclosure.

FIG. 9 is an enlarged view of a first area AA1 shown in FIG. 8 according to an embodiment of the present disclosure.

Referring to FIGS. 8 and 9, each of the first-first and first-second sensing electrodes SE1-1 and SE1-2 may include a plurality of first sensing portions SP1 arranged in the first direction DR1 and a plurality of first connection patterns CP1 connecting the first sensing portions SP1.

The first sensing portions SP1 may have a curved shape. As an example, the first sensing portions SP1 of the first-first sensing electrode SE1-1 and the first sensing portions SP1 of the first-second sensing electrode SE1-2 may have a shape curved outward.

The first connection patterns CP1 may extend in the first direction DR1, may be disposed between the first sensing portions SP1, and may be connected to the first sensing portions SP1. The first sensing portions SP1 may be connected to each other via the first connection patterns CP1.

Each of the first connection patterns CP1 may be disposed between two first sensing portions SP1 adjacent to each other in the first direction DR1 and may connect the two first sensing portions SP1. An insulating layer (refer to FIG. 11) may be disposed between the first connection patterns CP1 and the first sensing portions SP1, and the first connection patterns CP1 may be connected to the first sensing portions SP1 via first contact holes T-CH1 defined through the insulating layer.

Each of the second-first and second-second sensing electrodes SE2-1 and SE2-2 may include a plurality of second sensing portions SP2 arranged in the second direction DR2 and a plurality of first extension patterns EP1 extending from the second sensing portions SP2 to the second direction DR2. When viewed in the plane, the first extension patterns EP1 may extend to cross the first connection patterns CP1.

The second sensing portions SP2 may have a curved shape. As an example, the second sensing portions SP2 of the second-first sensing electrode SE2-1 and the second sensing portions SP2 of the second-second sensing electrode SE2-2 may have a shape curved outward.

In each of the second-first and second-second sensing electrodes SE2-1 and SE2-2, the first extension patterns EP1 may be formed integrally with the second sensing portions SP2. Each of the first extension patterns EP1 may be disposed between two second sensing portions SP2 adjacent to each other in the second direction DR2 and may extend from two second sensing portions SP2.

In an embodiment, the first sensing portions SP1 and the second sensing portions SP2 do not overlap each other, may be spaced apart from each other, and may be alternately arranged with each other. The first sensing portions SP1 may form a capacitance with the second sensing portions SP2.

The first and second sensing portions SP1 and SP2 and the first extension patterns EP1 may be disposed on the same layer. The first connection patterns CP1 may be disposed on a different layer from the first and second sensing portions SP1 and SP2 and the first extension patterns EP1. The first connection patterns CP1 may be disposed lower than the first and second sensing portions SP1 and SP2 and the first extension patterns EP1.

Each of the first pen sensing electrodes P-SE1 may include a plurality of first pen sensing portions P-SP1 arranged in the first direction DR1 and a plurality of second connection patterns CP2 connecting the first pen sensing portions P-SP1.

The first pen sensing portions P-SP1 may have a lozenge shape. However, the shape of the first pen sensing portions P-SP1 is not limited thereto. The second connection patterns CP2 may extend in the first direction DR1, may be disposed between the first pen sensing portions P-SP1, and may be connected to the first pen sensing portions P-SP1. The first pen sensing portions P-SP1 may be connected to each other via the second connection patterns CP2.

Each of the second connection patterns CP2 may be disposed between two first pen sensing portions P-SP1 adjacent to each other in the first direction DR1 and may connect two first pen sensing portions P-SP1. An insulating layer (refer to FIG. 12) may be disposed between the second connection patterns CP2 and the first pen sensing portions P-SP1, and the second connection patterns CP2 may be connected to the first pen sensing portions P-SP1 via second contact holes T-CH2 defined through the insulating layer.

Each of the second pen sensing electrodes P-SE2 may include a plurality of second pen sensing portions P-SP2 arranged in the second direction DR2 and a plurality of second extension patterns EP2 extending from the second pen sensing portions P-SP2 in the second direction DR2. When viewed in the plane, the first and second extension patterns EP1 and EP2 may extend to cross the first and second connection patterns CP1 and CP2.

The second pen sensing portions P-SP2 may have a lozenge shape. However, the shape of the second pen sensing portions P-SP2 is not limited thereto. The second extension patterns EP2 may be formed integrally with the second pen sensing portions P-SP2. Each of the second extension patterns EP2 may be disposed between two second pen sensing portions P-SP2 adjacent to each other in the second direction DR2 and may extend from the two second pen sensing portions P-SP2.

The first pen sensing portions P-SP1, the second pen sensing portions P-SP2, and the second extension patterns EP2 may be disposed on the same layer as the layer on which the first and second sensing portions SP1 and SP2 and the first extension patterns EP1 are disposed. The second connection patterns CP2 and the first connection patterns CP1 may be disposed on the same layer.

In FIG. 8, the first sensing lines TL1 may extend to cross the first pen sensing lines PSL1 while being insulated from the first pen sensing lines PSL1. As an example, referring to FIGS. 8 and 9, the first sensing lines TL1 may be formed integrally with the first sensing portions SP1 adjacent to the lower side of the active area AA and may extend from the first sensing portions SP1. The first pen sensing lines PSL1 may be formed integrally with the second connection patterns CP2 adjacent to the lower side of the active area AA and may extend from the second connection patterns CP2.

In FIG. 8, the first pen sensing lines PSL1 may be disposed lower than the first sensing lines TL1. An insulating layer may be disposed between the first pen sensing lines PSL1 and the first sensing lines TL1.

Figure 10:
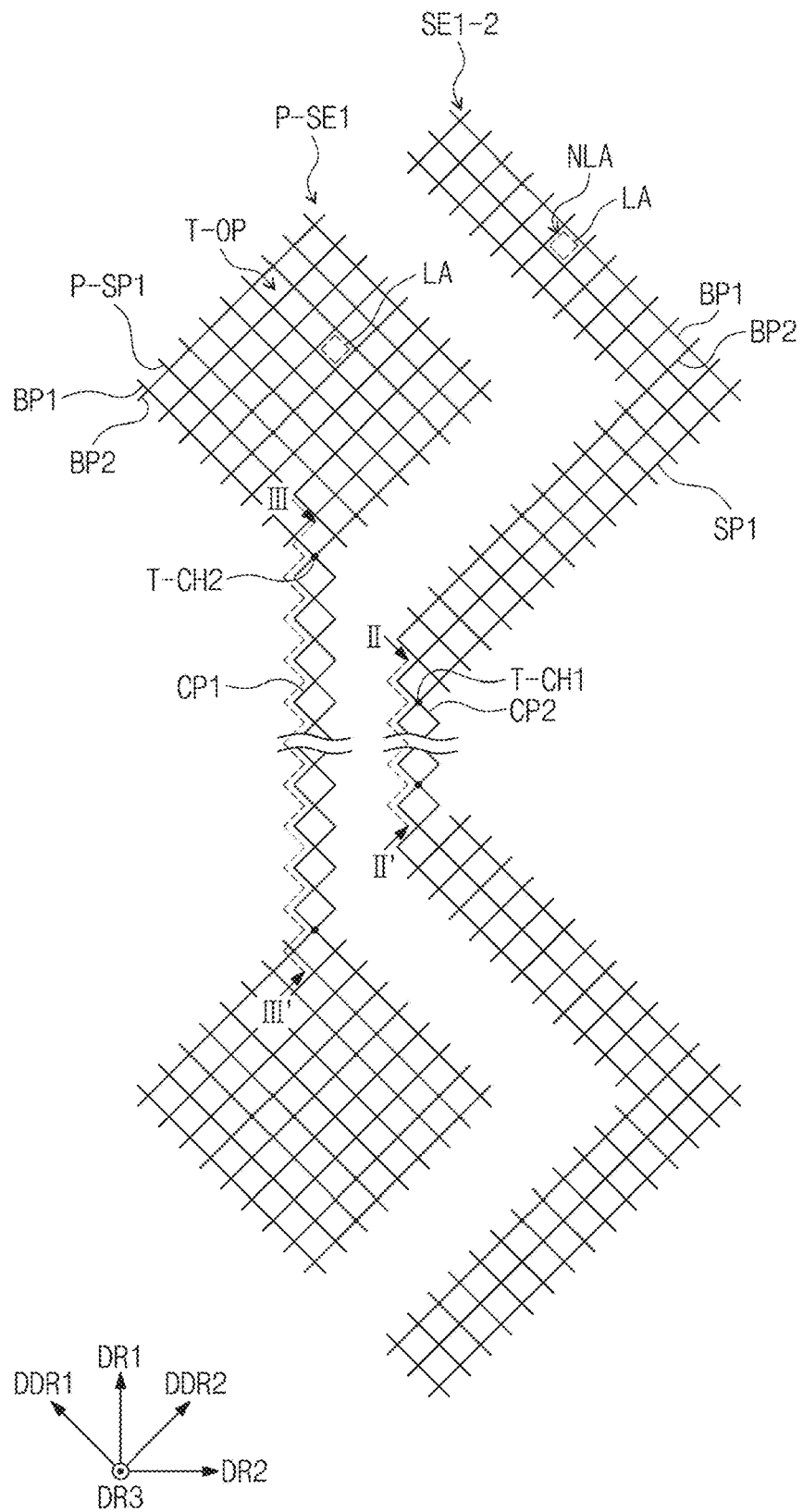
FIG. 10 is a view of a first pen sensing electrode and a first-second sensing electrode shown in FIG. 9 according to an embodiment of the present disclosure.

FIG. 10 is a view of the first pen sensing electrode P-SE1 and the first-second sensing electrode SE1-2 shown in FIG. 9 according to an embodiment of the present disclosure.

Referring to FIG. 10, the first pen sensing electrode P-SE1 and the first-second sensing electrode SE1-2 may have the mesh shape. As an example, each of the first pen sensing electrode P-SE1 and the first-second sensing electrode SE1-2 may include a plurality of first branches BP1 extending in a first diagonal direction DDR1 and a plurality of second branches BP2 extending in a second diagonal direction DDR2.

The first diagonal direction DDR1 may cross the first and second directions DR1 and DR2 on the plane defined by the first and second directions DR1 and DR2. The second diagonal direction DDR2 may cross the first diagonal direction DDR1 on the plane defined by the first and second directions DR1 and DR2.

The first and second branches BP1 and BP2 may cross each other and may be formed integrally with each other. The mesh shape of the first pen sensing electrode P-SE1 and the first-second sensing electrode SE1-2 may be defined by the first and second branches BP1 and BP2.

In an embodiment, the first-first sensing electrode SE1-1, the second pen sensing electrode P-SE2, and the second-first and second-second sensing electrodes SE2-1 and SE2-2 shown in FIG. 9 may have the same mesh shape as those of components shown in FIG. 10.

Openings T-OP having a lozenge shape may be defined by the first and second branches BP1 and BP2. The light emitting areas LA of the pixels PX may be defined in the openings T-OP, respectively. Accordingly, the first and second branches BP1 and BP2 may overlap the non-light-emitting area NLA. That is, the first-second sensing electrode SE1-2 and the second pen sensing electrode P-SE2 may overlap the non-light-emitting area NLA.

Since the first and second branches BP1 and BP2 are arranged in the non-light-emitting area NLA, lights emitted from the light emitting elements OLED of the pixels PX may be emitted normally without being affected by the first-second sensing electrode SE1-2 and the second pen sensing electrode P-SE2.

Figure 11:
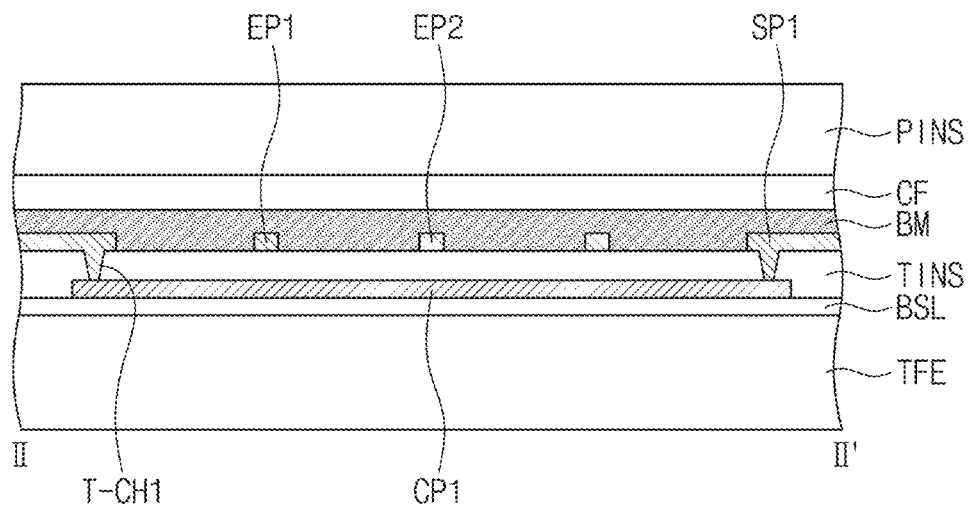
FIG. 11 is a cross-sectional view taken along lines II-II' shown in FIGS. 9 and 10 according to an embodiment of the present disclosure.
Figure 12:
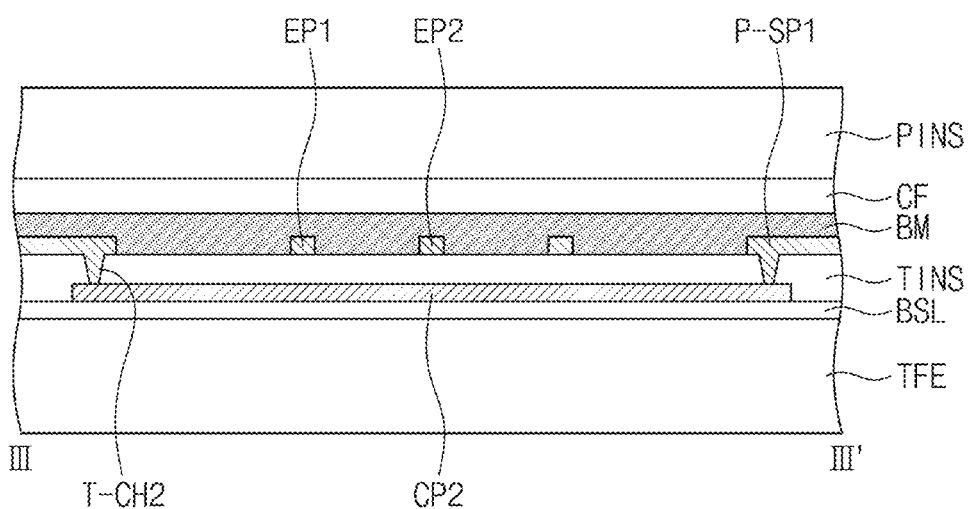
FIG. 12 is a cross-sectional view taken along lines III-III' shown in FIGS. 9 and 10 according to an embodiment of the present disclosure.

FIG. 11 is a cross-sectional view taken along line II-II' shown in FIGS. 9 and 10 according to an embodiment of the present disclosure. FIG. 12 is a cross-sectional view taken along line III-III' shown in FIGS. 9 and 10 according to an embodiment of the present disclosure.

Lines II-II' and III-III' shown in FIG. 9 may correspond to lines II-II' and III-III' shown in FIG. 10.

Referring to FIGS. 11 and 12, the base layer BSL may be disposed on the thin film encapsulation layer TFE, and the first connection pattern CP1 and the second connection pattern CP2 may be disposed on the base layer BSL. The first connection pattern CP1 and the second connection pattern CP2 may be formed by the first conductive pattern CTL1.

The insulating layer TINS may be disposed on the base layer BSL and may cover the first and second connection patterns CP1 and CP2. The first sensing portions SP1, the first pen sensing portions P-SP1, and the first and second extension patterns EP1 and EP2 may be disposed on the insulating layer TINS. In an embodiment, the second sensing portions SP2 formed integrally with the first extension patterns EP1 and the second pen sensing portions P-SP2 formed integrally with the second extension patterns EP2 may be disposed on the insulating layer TINS.

The first sensing portions SP1 may be connected to the first connection pattern CP1 via the first contact holes T-CH1 defined through the insulating layer TINS. The first pen sensing portions P-SP1 may be connected to the second connection pattern CP2 via the second contact holes T-CH2 defined through the insulating layer TINS.

The black matrix BM may be disposed on the insulating layer TINS and may cover the first sensing portions SP1, the first pen sensing portions P-SP1, and the first and second extension patterns EP1 and EP2. The color filter CF may be disposed on the black matrix BM, and the planarization insulating layer PINS may be disposed on the color filter CF.

Figure 13A:
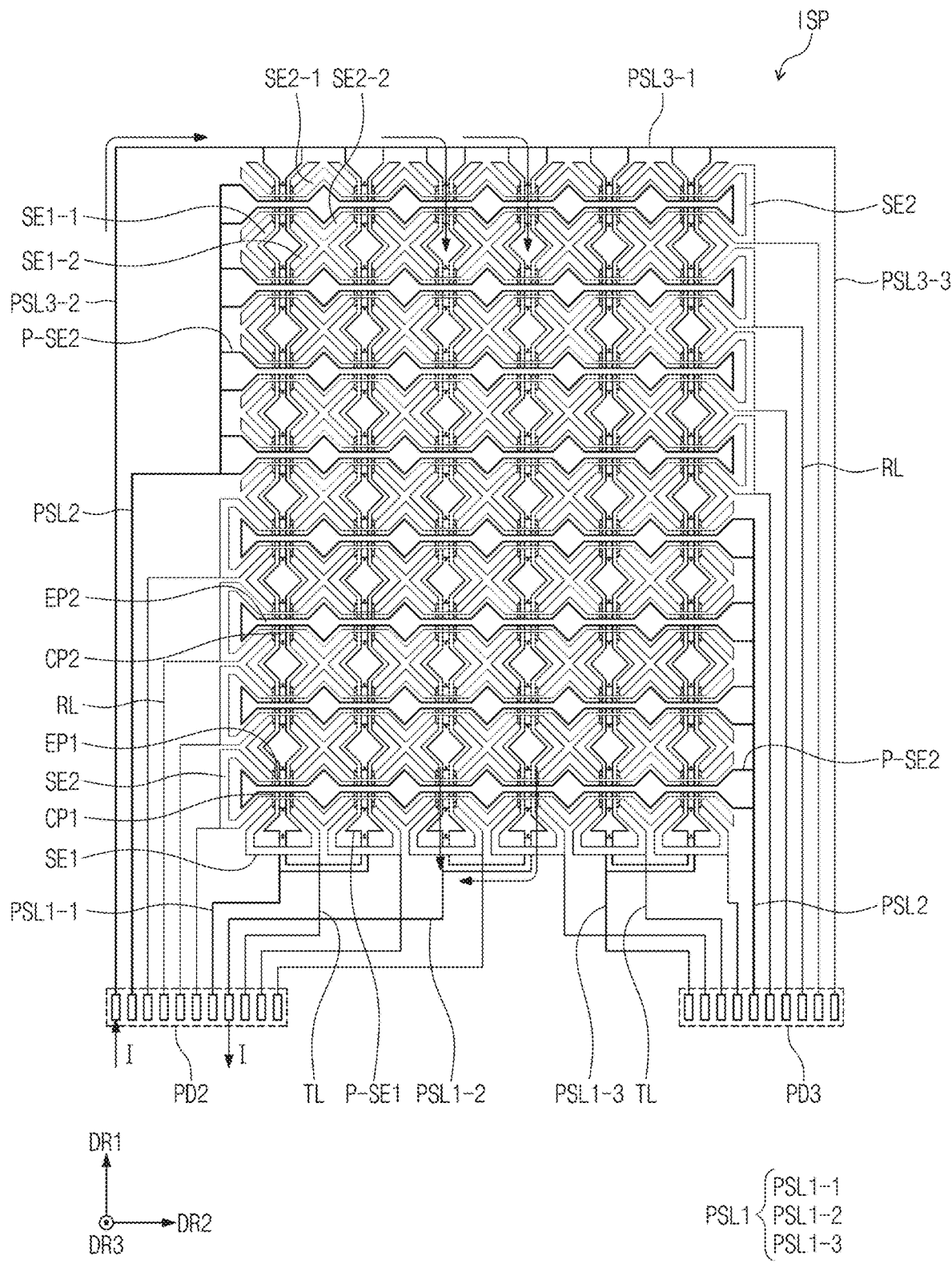
FIGS. 13A, 13B and 13C are views illustrating an operation of pen sensing electrodes shown in FIG. 8 according to an embodiment of the present disclosure.
Figure 13B:
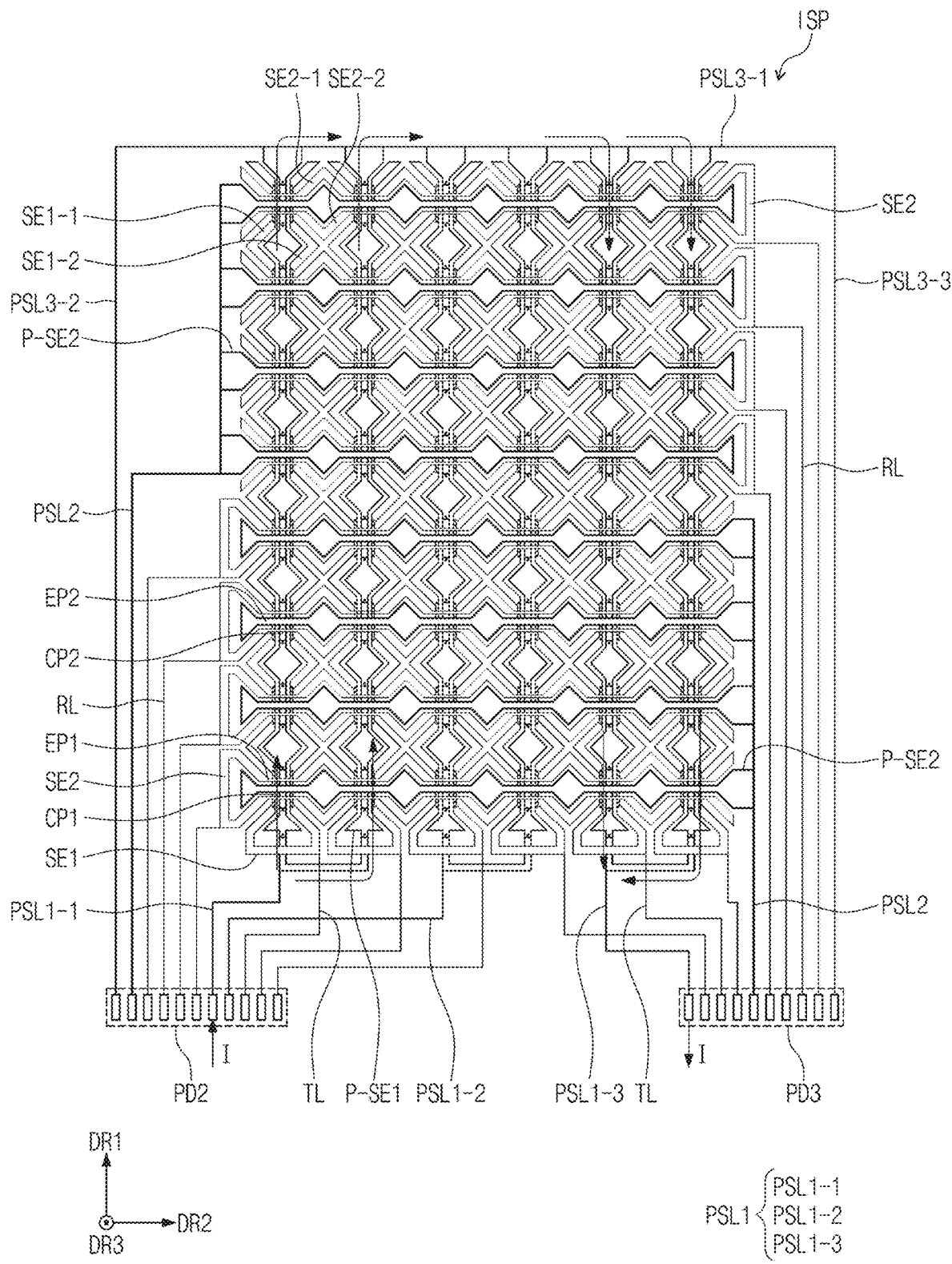
Figure 13C:
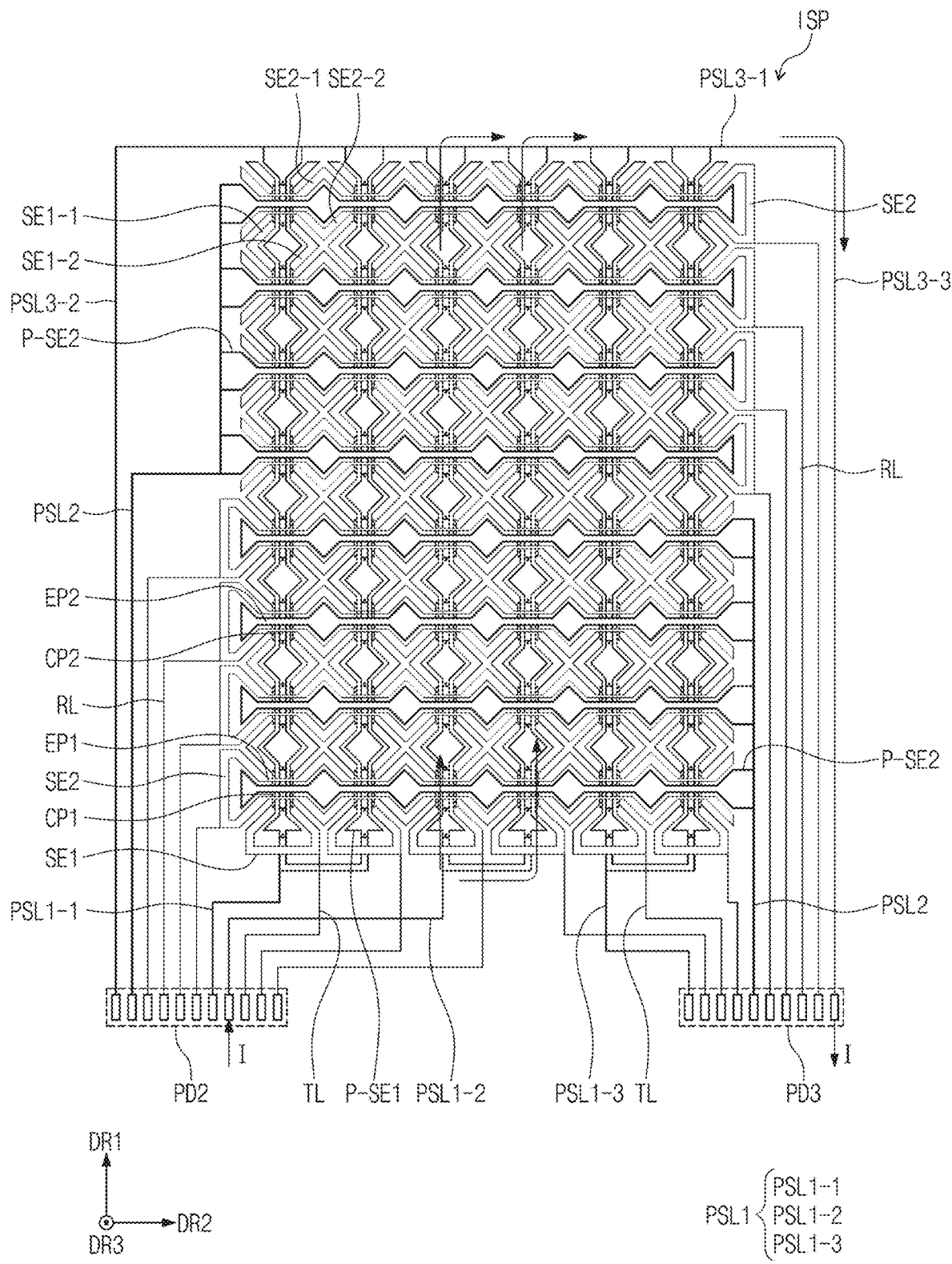
Figure 14:
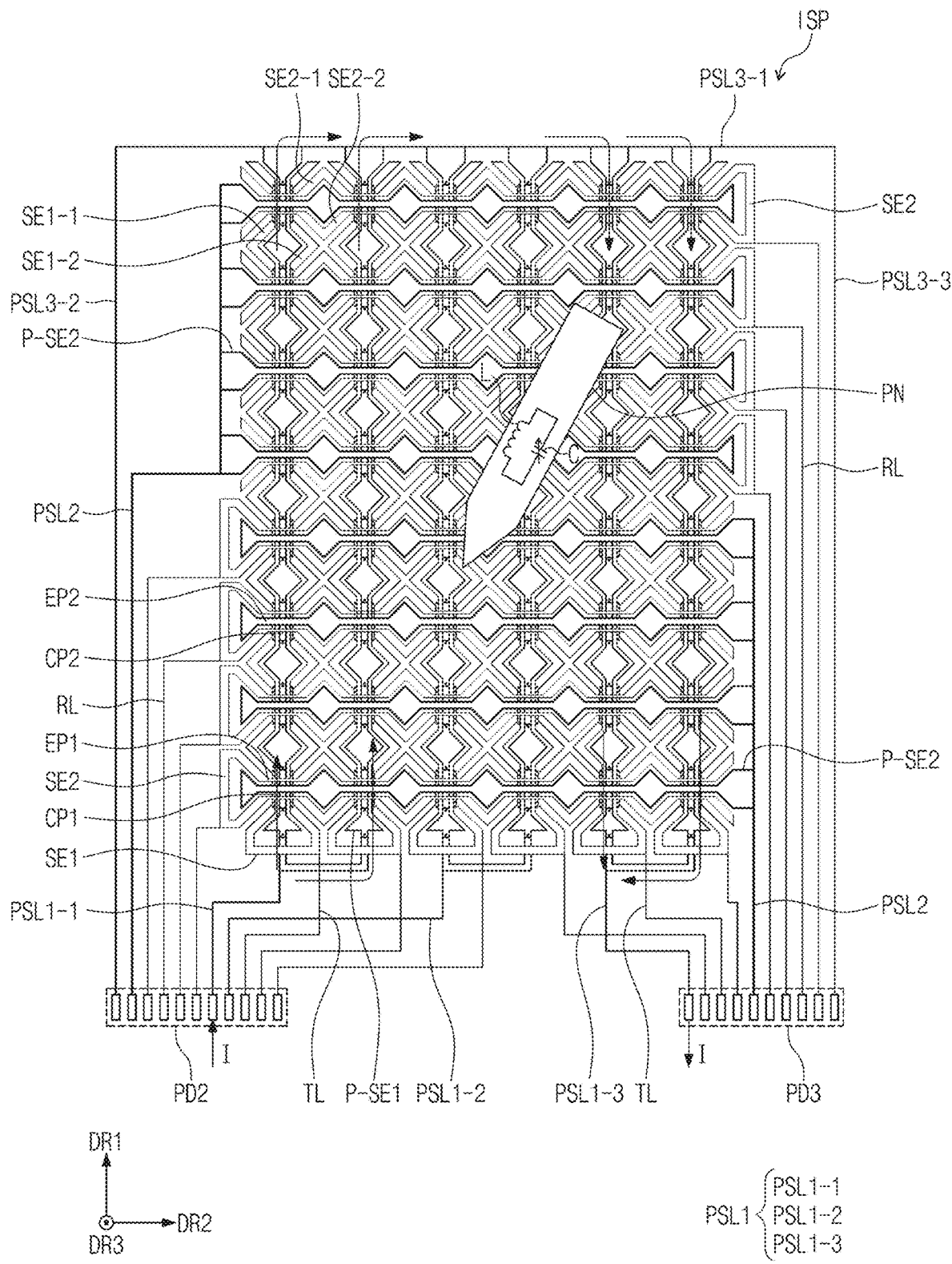
FIG. 14 is a view illustrating a charging operation of a pen disposed above an input sensing part according to an embodiment of the present disclosure.
Figure 15:
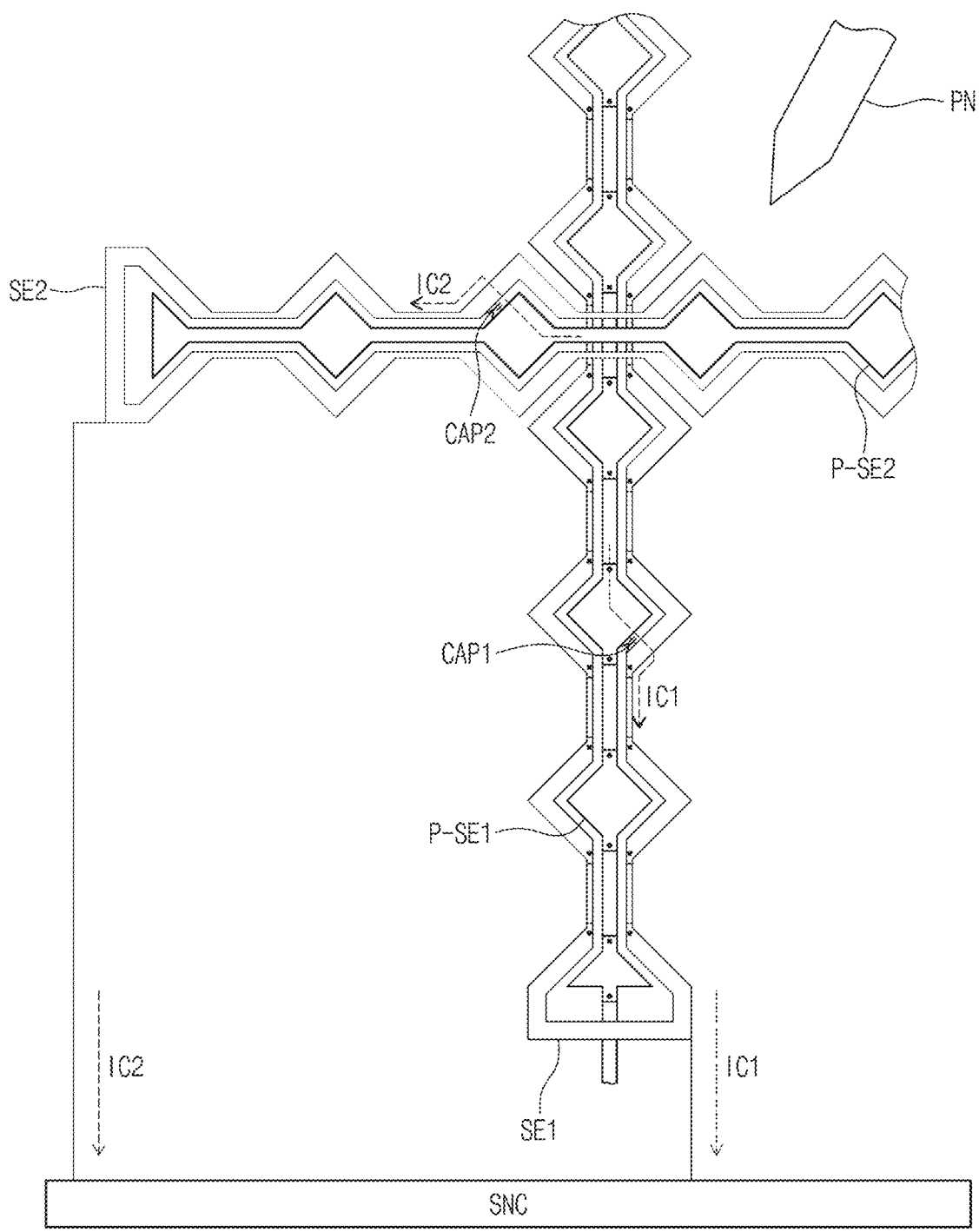
FIG. 15 is a view illustrating a sensing operation of a touch of a pen shown in FIG. 13 according to an embodiment of the present disclosure.

FIGS. 13A to 13C are views illustrating an operation of the pen sensing electrodes shown in FIG. 8 according to an embodiment of the present disclosure. FIG. 14 is a view illustrating a charging operation of the pen disposed above the input sensing part ISP according to an embodiment of the present disclosure. FIG. 15 is a view illustrating a sensing operation with respect to a touch of the pen shown in FIG. 14 according to an embodiment of the present disclosure.

In FIGS. 13A to 13C and 14, a boundary between the active area AA and the non-active area NAA of the input sensing part ISP is omitted. Hereinafter, the first pen sensing lines PSL1 are referred to as first-first, first-second, and first-third pen sensing lines PSL1-1, PSL1-2, and PSL1-3 in order from left to right in FIGS. 13A to 13C and 14.

Referring to FIG. 13A, in an embodiment, the second sensing period may include a charging period and a pen sensing period following the charging period. During the charging period, the first-first, first-second, and first-third pen sensing lines PSL1-1, PSL1-2, and PSL1-3, the first pen sensing electrodes P-SE1, and the third-first, third-second, and third-third pen sensing lines PSL3-1, PSL3-2, and PSL3-3 may be driven to sequentially form coils.

For example, the second and third pads PD2 and PD3 may be connected to a driving circuit of the sensing IC. The driving circuit may apply a driving signal to the first-first, first-second, and first-third pen sensing lines PSL1-1, PSL1-2, and PSL1-3, the first pen sensing electrodes P-SE1, and the third-first, third-second, and third-third pen sensing lines PSL3-1, PSL3-2, and PSL3-3 in a certain order.

In a first period of the charging period, the driving circuit may be connected to the second pad PD2 connected to the third-second pen sensing line PSL3-2 and the second pad PD2 connected to the first-second pen sensing line PSL1-2. The driving circuit may apply a driving current I to the third-second pen sensing line PSL3-2. The driving current I may flow through the third-second pen sensing line PSL3-2, the first pen sensing electrodes P-SE1 connected to the first-second pen sensing line PSL1-2, and the first-second pen sensing line PSL1-2.

Accordingly, the third-second pen sensing line PSL3-2, the first pen sensing electrodes P-SE1 connected to the first-second pen sensing line PSL1-2, and the first-second pen sensing line PSL1-2 may form a coil, and the driving current I may flow through the third-second pen sensing line PSL3-2, the first pen sensing electrodes P-SE1 connected to the first-second pen sensing line PSL1-2, and the first-second pen sensing line PSL1-2.

Referring to FIG. 13B, in a second period following the first period of the charging period, the driving circuit may be connected to the second pad PD2 connected to the first-first pen sensing line PSL1-1 and the third pad PD3 connected to the first-third pen sensing line PSL1-3. The driving circuit may apply the driving current I to the first-first pen sensing line PSL1-1. The driving current I may flow through the first-first pen sensing line PSL1-1, the first pen sensing electrodes P-SE1 connected to the first-first pen sensing line PSL1-1, the first pen sensing electrodes P-SE1 connected to the first-third pen sensing line PSL1-3, and the first-third pen sensing line PSL1-3.

Accordingly, the first-first pen sensing line PSL1-1, the first pen sensing electrodes P-SE1 connected to the first-first pen sensing line PSL1-1, the first pen sensing electrodes P-SE1 connected to the first-third pen sensing line PSL1-3, and the first-third pen sensing line PSL1-3 may form a coil, and the driving current I may flow through the first-first pen sensing line PSL1-1, the first pen sensing electrodes P-SE1 connected to the first-first pen sensing line PSL1-1, the first pen sensing electrodes P-SE1 connected to the first-third pen sensing line PSL1-3, and the first-third pen sensing line PSL1-3.

Referring to FIG. 13C, the driving circuit may be connected to the second pad PD2 connected to the first-second pen sensing line PSL1-2 and the third pad PD3 connected to the third-third pen sensing line PSL3-3 in a third period following the second period of the charging period. The driving circuit may apply the driving current I to the first-second pen sensing line PSL1-2. The driving current I may flow through the first-second pen sensing line PSL1-2, the first pen sensing electrodes P-SE1 connected to the first-second pen sensing line PSL1-2, and the third-third pen sensing line PSL3-3.

Accordingly, the first-second pen sensing line PSL1-2, the first pen sensing electrodes P-SE1 connected to the first-second pen sensing line PSL1-2, and the third-third pen sensing line PSL3-3 may form a coil, and the driving current I may flow through the first-second pen sensing line PSL1-2, the first pen sensing electrodes P-SE1 connected to the first-second pen sensing line PSL1-2, and the third-third pen sensing line PSL3-3.

The driving sequence described above is merely an example, and the driving sequence is not limited thereto. As an example, the driving current I may flow the third-second pen sensing line PSL3-2, the first pen sensing electrodes P-SE1 connected to the first-first pen sensing line PSL1-1, and the first-first pen sensing line PSL1-1 in the first period.

In addition, the driving current I may flow through the first-first pen sensing line PSL1-1, the first pen sensing electrodes P-SE1 connected to the first-first pen sensing line PSL1-1, the first pen sensing electrodes P-SE1 connected to the first-second pen sensing line PSL1-2, and the first-second pen sensing line PSL1-2 in the second period. Then, the driving current I may flow through the first pen sensing electrodes P-SE1 and the third-third pen sensing line PSL3-3 in a similar sequence.

Referring to FIG. 14, as described with reference to FIGS. 13A to 13C, the driving current I may flow through the first-first, first-second, and first-third pen sensing lines PSL1-1, PSL1-2, and PSL1-3, the first pen sensing electrodes P-SE1, and the third-first, third-second, and third-third pen sensing lines PSL3-1, PSL3-2, and PSL3-3, and the pen PN may be placed above the input sensing part ISP.

The pen PN may include an inductor L and a capacitor C connected to the inductor L. The inductor L and the capacitor C may form an LC resonant circuit. The capacitor C may be a variable capacitor whose capacity is variable. The capacitor C will be described in detail with reference to FIGS. 16 and 17. When the pen PN is placed on the display module DM, the capacitor C may be charged for the charging period.

As an example, the pen PN may be disposed between the first pen sensing electrodes P-SE1 connected to the first-first pen sensing line PSL1-1 and the first pen sensing electrodes P-SE1 connected to the first-third pen sensing line PSL1-3.

In this case, a magnetic flux may be generated by the driving current I flowing through the first-first pen sensing line PSL1-1, the first pen sensing electrodes P-SE1 connected to the first-first pen sensing line PSL1-1, the first pen sensing electrodes P-SE1 connected to the first-third pen sensing line PSL1-3, and the first-third pen sensing line PSL1-3. The magnetic flux may be introduced to a ferrite core surrounding a coil of the inductor L, and in this case, an induced current may be generated in the coil of the inductor L. The capacitor C may be charged with electric charges by the induced current.

During the charging period, a constant voltage may be applied to the second pen sensing electrodes P-SE2 through the second pen sensing lines PSL2.

Hereinafter, the pen sensing operation will be described with reference to FIG. 15. For convenience of explanation, FIG. 15 shows one first pen sensing electrode P-SE1 and one second pen sensing electrode P-SE2 through which the induced current generated by the pen PN flows. In addition, the first sensing electrode SE1 adjacent to the first pen sensing electrode P-SE1 and the second sensing electrode SE2 adjacent to the second pen sensing electrode P-SE2 are shown together with the first pen sensing electrode P-SE1 and the second pen sensing electrode P-SE2.

Referring to FIG. 15, during the pen sensing period following the charging period, a sensing circuit SNC of the sensing IC may be connected to the first and second sensing electrodes SE1 and SE2. In an embodiment, during the pen sensing period, the driving current I is not applied to the first-first, first-second, and first-third pen sensing lines PSL1-1, PSL1-2, and PSL1-3, the first pen sensing electrodes P-SE1, and the third-first, third-second, and third-third pen sensing lines PSL3-1, PSL3-2, and PSL3-3.

The LC resonant circuit of the pen PN may generate the magnetic flux while consuming the charged electric charges. The induced current may be generated in the first pen sensing electrode P-SE1 and the second pen sensing electrode P-SE2 by the magnetic flux.

A first induced current IC1 generated in the first pen sensing electrode P-SE1 may be provided to the first sensing electrode SE1 by a first capacitor CAP1 formed by the first sensing electrode SE1 and the first pen sensing electrode P-SE1 and then may be provided to the sensing circuit SNC. A second induced current IC2 generated in the second pen sensing electrode P-SE2 may be provided to the second sensing electrode SE2 by a second capacitor CAP2 formed by the second sensing electrode SE2 and the second pen sensing electrode P-SE2 and then may be provided to the sensing circuit SNC.

The sensing circuit SNC may sense the first induced current IC1 and the second induced current IC2 provided thereto via the first and second sensing electrodes SE1 and SE2, and thus may sense the location of the pen PN. That is, the touch generated by the pen PN may be sensed by the first and second pen sensing electrodes P-SE1 and P-SE2 and the first and second sensing electrodes SE1 and SE2.

Figure 16:
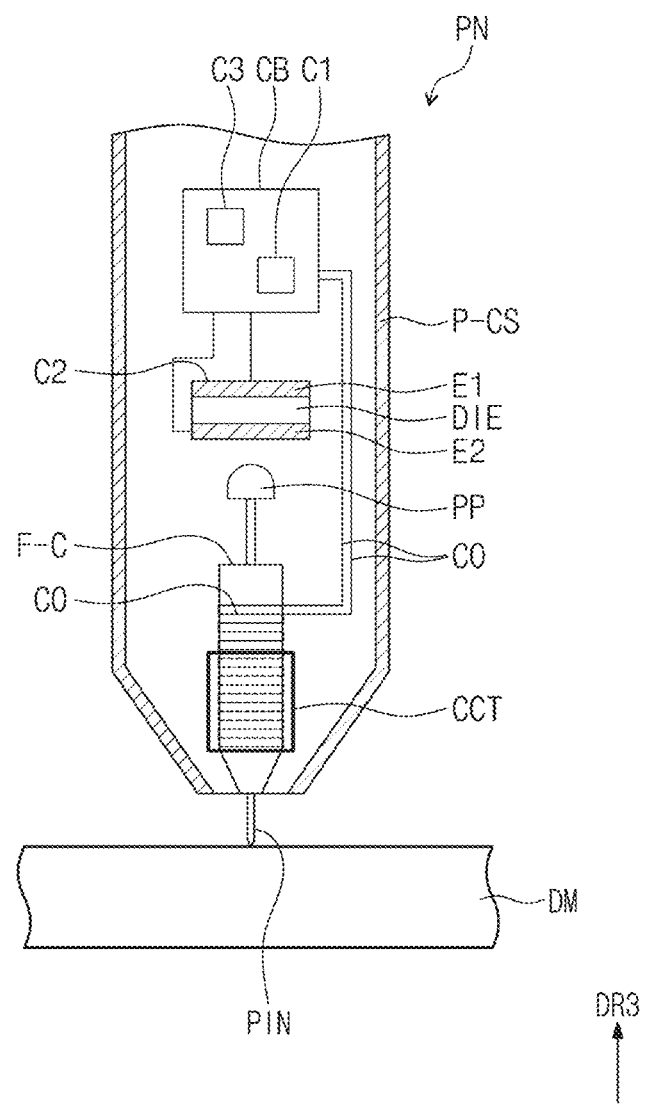
FIG. 16 is a view of the pen shown in FIG. 14 according to an embodiment of the present disclosure.
Figure 17:
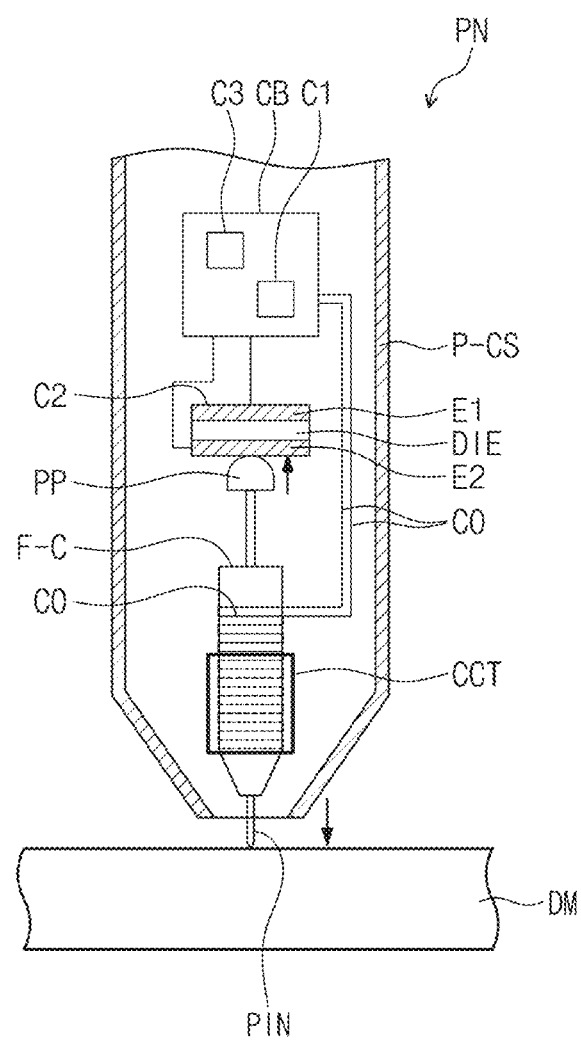
FIG. 17 is a view illustrating a pressing operation of the pen shown in FIG. 16.
Figure 18:
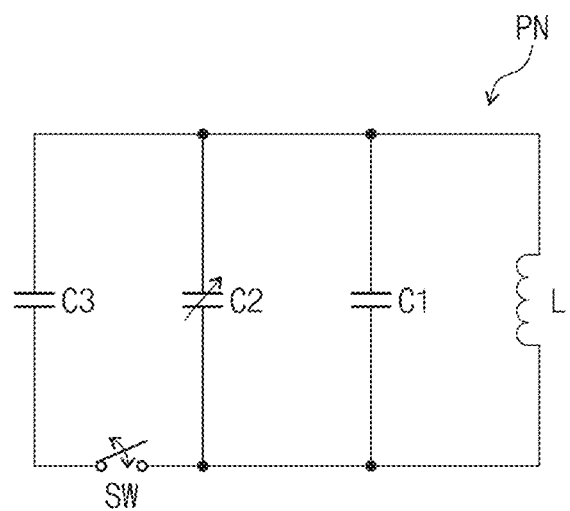
FIG. 18 is an equivalent circuit diagram of inner components of the pen shown in FIG. 16.

FIG. 16 is a view of the pen PN shown in FIG. 14 according to an embodiment of the present disclosure. FIG. 17 is a view illustrating a pressing operation of the pen PN shown in FIG. 16 according to an embodiment of the present disclosure. FIG. 18 is an equivalent circuit diagram of inner components of the pen PN shown in FIG. 16 according to an embodiment of the present disclosure.

Referring to FIG. 16, the pen PN may include a pen case P-CS, a ferrite core F-C, a pin PIN, a coil CO, a cover conductor CCT, a pressure part PP, first, second, and third capacitors C1, C2, and C3, and a circuit board CB. The ferrite core F-C, the coil CO, the cover conductor CCT, the pressure part PP, the first, second, and third capacitors C1, C2, and C3, and the circuit board CB may be disposed in the pen case P-CS.

The ferrite core F-C may include a ferromagnetic substance. The ferrite core F-C may be provided in the pen case P-CS and may be disposed at a lower side of the pen case P-CS. The ferrite core F-C may have a cylindrical shape extending in the third direction DR3.

The pin PIN may be connected to a lower end of the ferrite core F-C and may be exposed to the outside of the pen case P-CS. The pin PIN may protrude from the lower side of the pen case P-CS in the third direction DR3. When the pen PN is placed on the display module DM, the pin PIN may be in contact with an upper surface of the display module DM.

The coil CO may be disposed at an outer surface of the ferrite core F-C and may surround the outer surface of the ferrite core F-C. The coil CO may extend to the circuit board CB and may be connected to the circuit board CB.

The pressure part PP may be connected to an upper end of the ferrite core F-C and may extend upwardly. The circuit board CB may be disposed above the pressure part PP.

The first capacitor C1 and the third capacitor C3 may be disposed on the circuit board CB. The second capacitor C2 may be disposed between the circuit board CB and the pressure part PP. The second capacitor C2 may be connected to the circuit board CB.

The coil CO may be connected to the first capacitor C1 via the circuit board CB. The first capacitor C1 and the third capacitor C3 may be connected to each other in parallel in the circuit board CB. The second capacitor C2 may be connected to the first capacitor C1 and the third capacitor C3 in parallel via the circuit board CB. This structure will be illustrated in the equivalent circuit diagram of FIG. 18.

The second capacitor C2 may include a first electrode E1, a second electrode E2 disposed on the first electrode E1, and a dielectric substance DIE disposed between the first and second electrodes E1 and E2. The first electrode E1 and the second electrode E2 may be connected to the circuit board CB.

The cover conductor CCT may surround a portion of the coil CO. As an example, the portion of the coil CO, which is covered by the cover conductor CCT, is indicated by a dotted line. A function of the cover conductor CCT will be described in detail below.

Referring to FIG. 17, when the pen PN is pressed to the display module DM, the pin PIN, the ferrite core F-C, and the pressure part PP may move upwardly. The pressure part PP may press the first electrode E1 of the second capacitor C2. In this case, a thickness of the dielectric substance DIE may be reduced. Since the thickness of the dielectric substance DIE is varied, a capacitance of the second capacitor C2 may be varied. Accordingly, the second capacitor C2 may be referred to as a variable capacitor.

Referring to FIG. 18, the pen PN may include the inductor L formed by the coil CO, the first capacitor C1 connected to the inductor in parallel, the second capacitor C2 connected to the first capacitor C1 in parallel, and the third capacitor C3 connected to the second capacitor C2 in parallel.

Since the second capacitor C2 is the variable capacitor, a combined capacitance of the first, second, and third capacitors C1, C2, and C3 may be varied. Accordingly, the capacitor C shown in FIG. 14 may include the first, second, and third capacitors C1, C2, and C3 and may form the variable capacitor.

The circuit board CB may include a switch SW. The switch SW may switch a connection between the second capacitor C2 and the third capacitor C3.

Referring to FIGS. 16, 17, and 18, when the pen PN touches the display module DM, the switch SW may be in an off state, and the first and second capacitors C1 and C2 may be connected to each other. The pen PN may have a first resonant frequency by the LC resonant circuit according to the combined capacitance of the first and second capacitors C1 and C2.

When the switch SW is in the off state and the pen PN is pressed to the display module DM, the capacitance of the second capacitor C2 may be changed. In this case, the pen PN may have a second resonant frequency by the LC resonant circuit according to a combined capacitance of the first capacitor C1 and the second capacitor C2 whose capacitance is varied.

When the user turns on the switch SW, the pen PN may have a third resonant frequency by the LC resonant circuit according to a combined capacitance of the first, second, and third capacitors C1, C2, and C3.

The induced current generated in the first and second pen sensing electrodes P-SE1 and P-SE2 of the input sensing part ISP may be changed depending on the resonant frequency of the pen PN. When drawing a line using the pen PN at the first resonant frequency, a line may be displayed on the display module DM.

When drawing a line using the pen PN at the second resonant frequency, a bold line may be displayed on the display module DM. That is, when drawing a line while pressing the pen PN on the display module DM, a thicker line may be displayed.

The pen PN may perform a function of an eraser at the third resonant frequency. That is, the line drawn by the pen PN may be erased by the pen PN generating the third resonant frequency.

Figure 19:
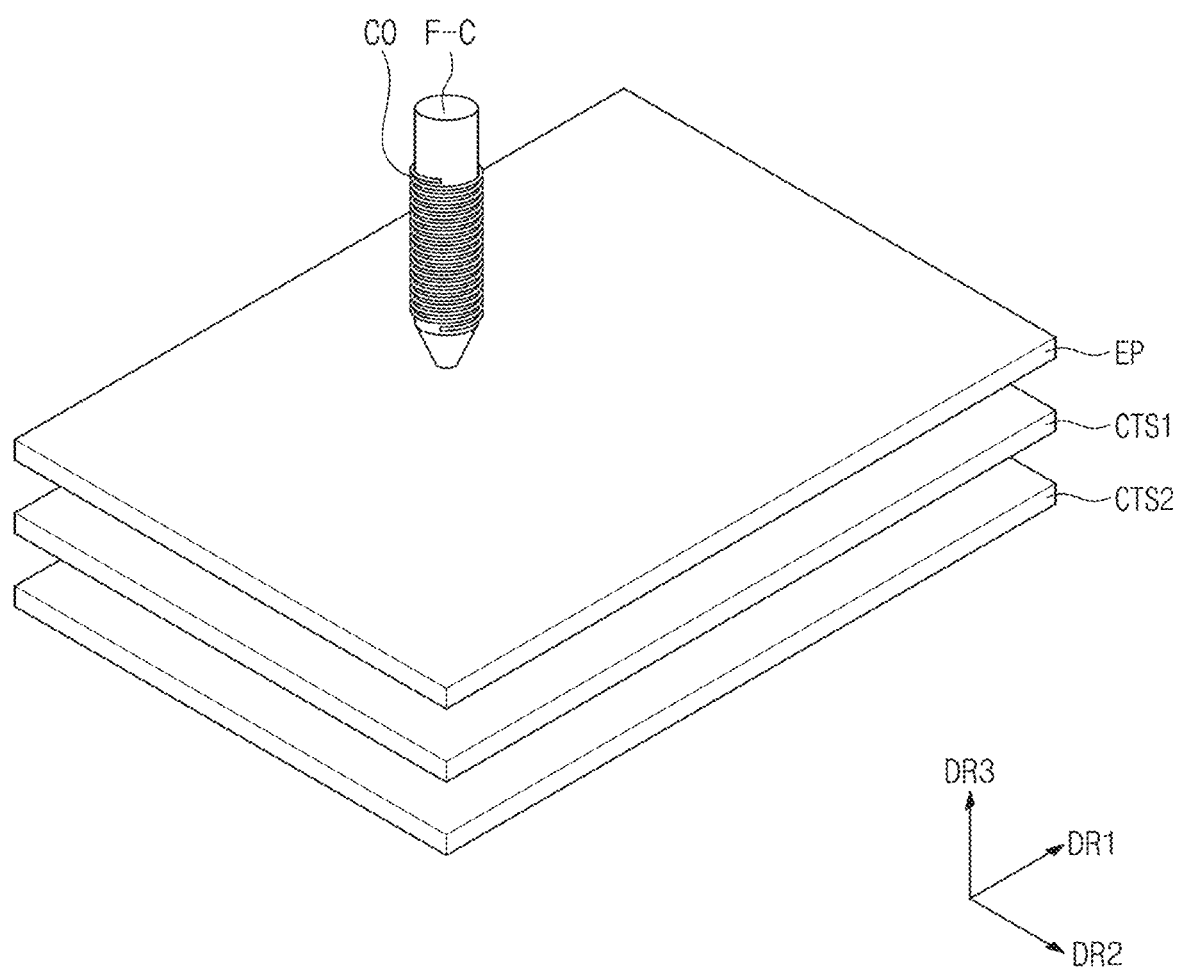
FIG. 19 is a view of a ferrite core placed vertically on an electronic panel and a coil surrounding the ferrite core.
Figure 20:
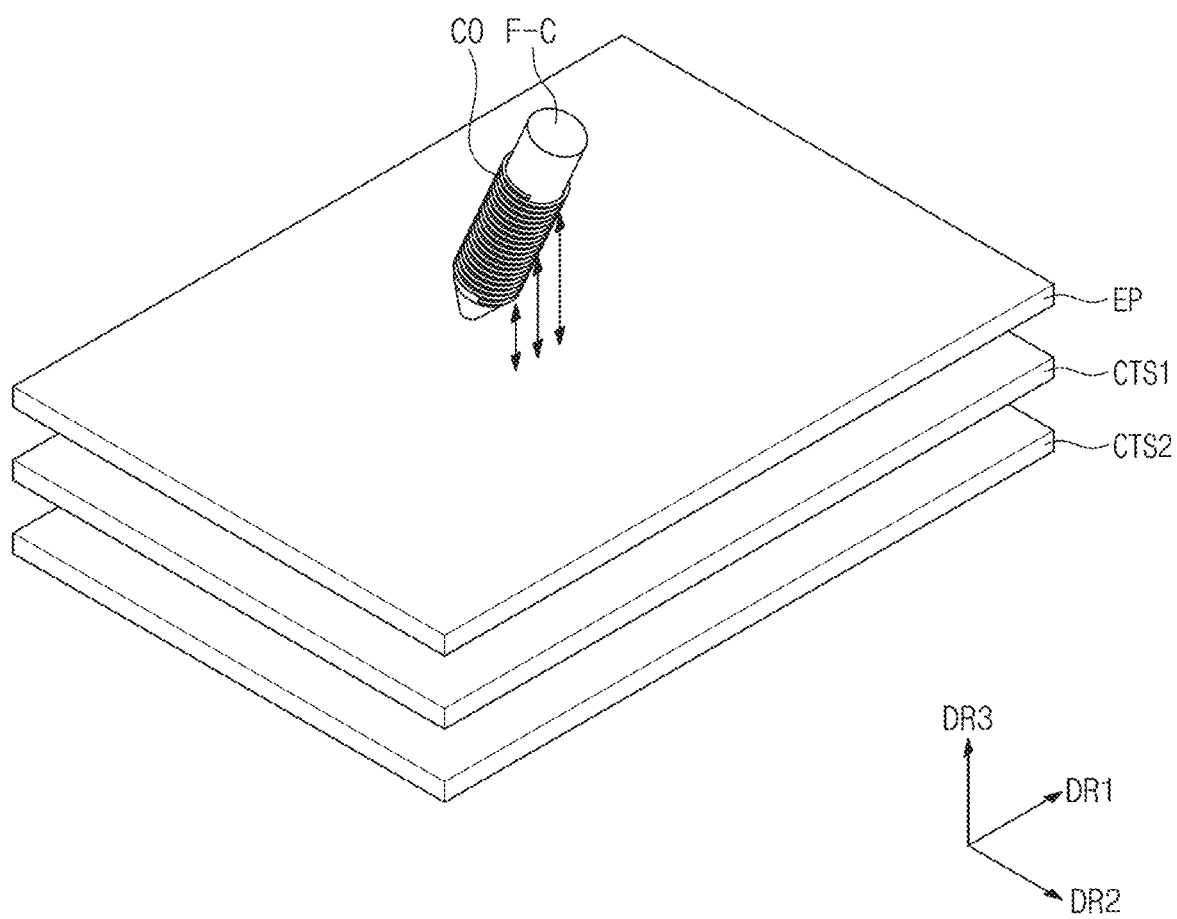
FIG. 20 is a view of a ferrite core placed tilted on an electronic panel and a coil surrounding the ferrite core.

FIG. 19 is a view of the ferrite core F-C placed vertically on the electronic panel EP and the coil CO surrounding the ferrite core F-C. FIG. 20 is a view of the ferrite core F-C placed tilted on the electronic panel EP and the coil CO surrounding the ferrite core F-C.

Referring to FIGS. 19 and 20, the ferrite core F-C and the coil CO may be disposed on the electronic panel EP. The first conductive sheet CTS1 may be disposed under the electronic panel EP, and the second conductive sheet CTS2 may be disposed under the first conductive sheet CTS1.

The coil CO may have an inductance affected by a magnetic permeability of its surroundings. The first conductive sheet CTS1 may include a ferromagnetic substance and may have high magnetic permeability. A side of the coil CO may become closer to the first conductive sheet CTS1 when the ferrite core F-C is tilted than when the ferrite core F-C is placed vertically. That is, when viewed in the plane, a portion of the coil CO, which overlaps the first conductive sheet CTS1, may increase. In this case, the inductance of the coil may increase, and the inductance may be changed.

Due to the change in inductance, the sensing operation for the pen PN may not be normally performed. As an example, when the ferrite core F-C is tilted, the first resonant frequency may be converted to the second resonant frequency due to the change in inductance and the bold line may be displayed on the display module DM even though the user does not press the pen PN. That is, the pen may malfunction against the user's intention.

Figure 21:
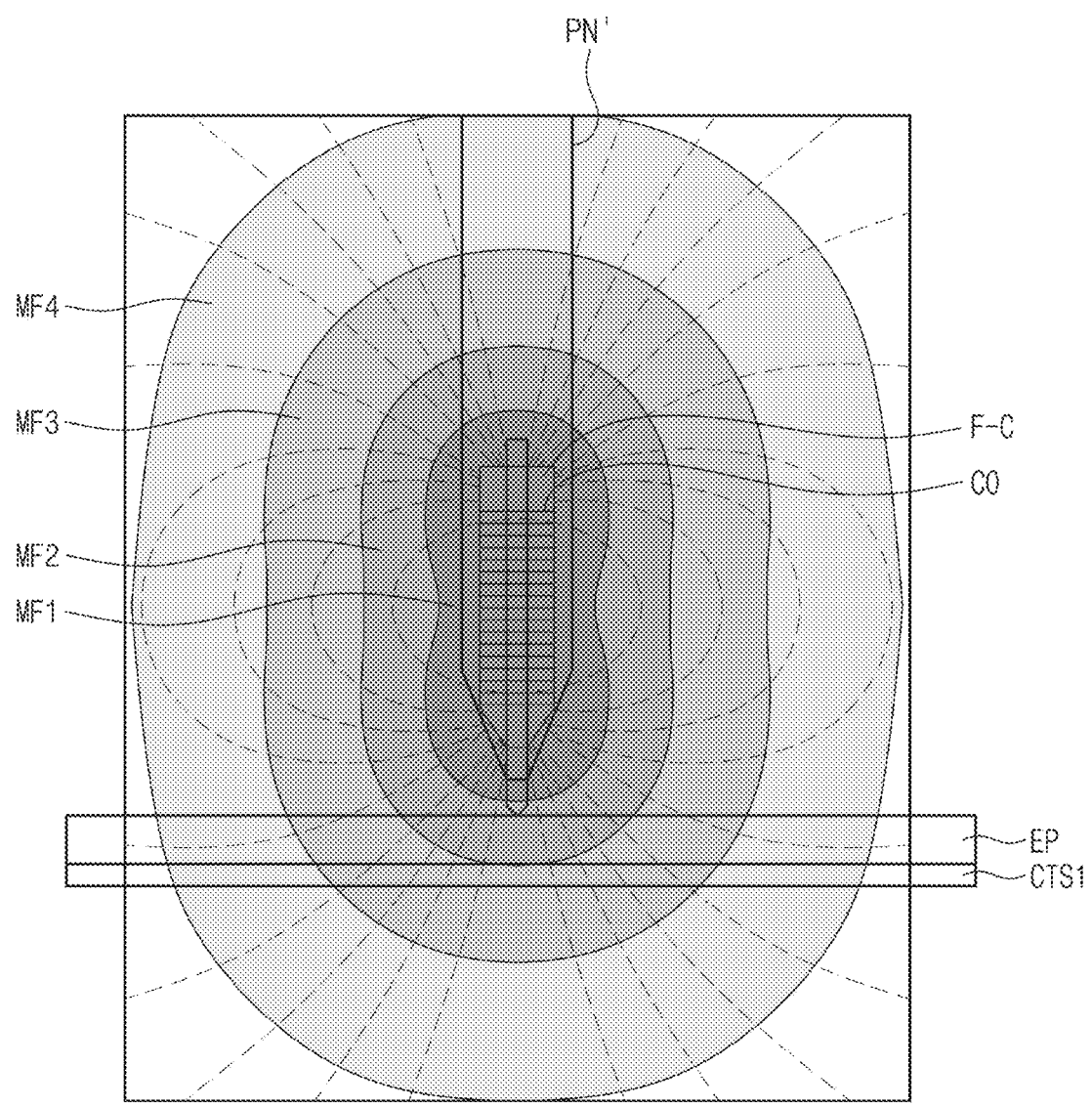
FIG. 21 is a view showing the ferrite core, a magnetic flux density around the coil, an electronic panel, and a first conductive sheet shown in FIG. 19.
Figure 22:
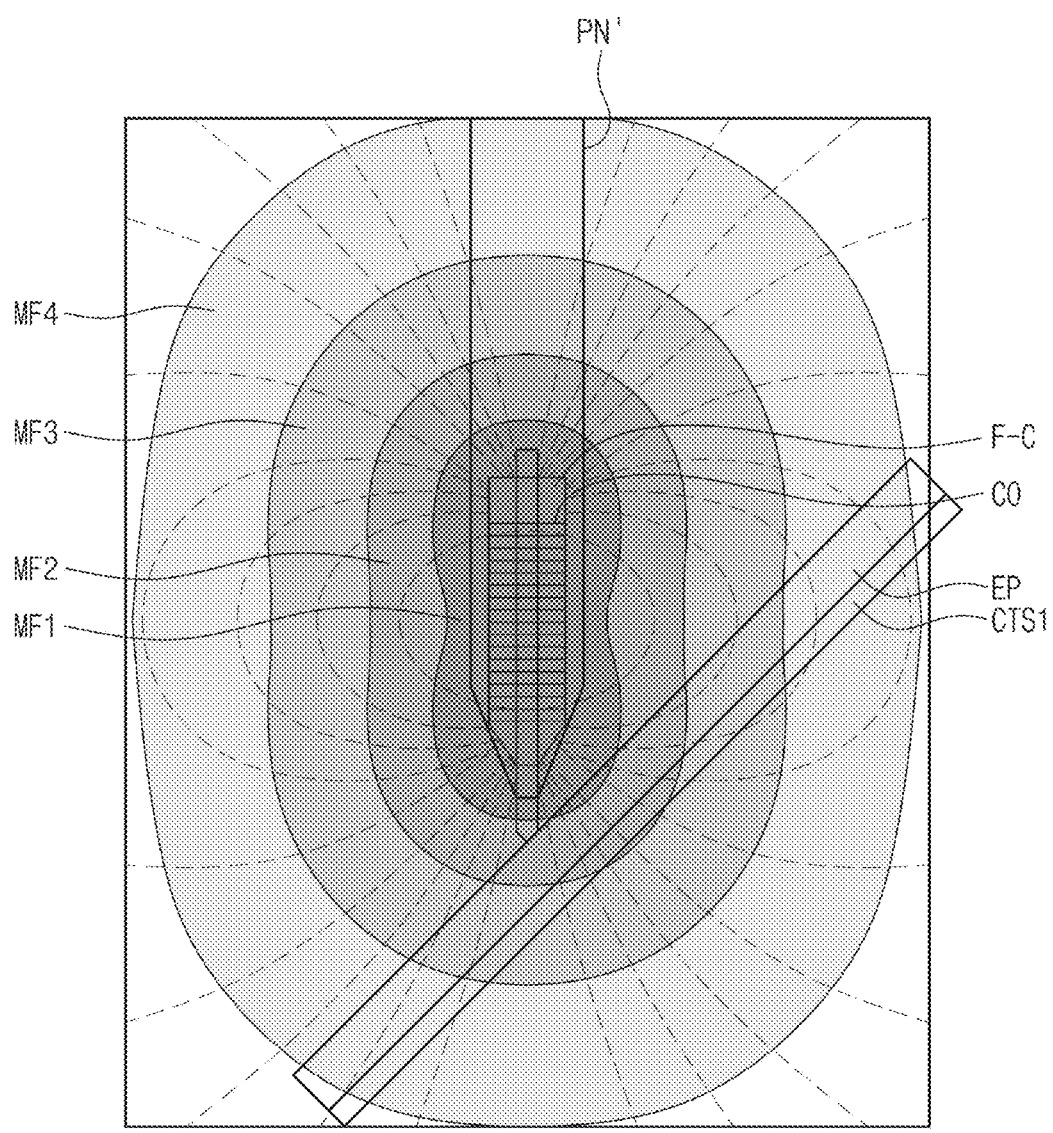
FIG. 22 is a view showing the ferrite core, a magnetic flux density around the coil, an electronic panel, and a first conductive sheet shown in FIG. 20.

FIG. 21 is a view showing the ferrite core, the magnetic flux density around the coil, the electronic panel, and the first conductive sheet shown in FIG. 19. FIG. 22 is a view showing the ferrite core, the magnetic flux density around the coil, the electronic panel, and the first conductive sheet shown in FIG. 20.

In FIGS. 21 and 22, a pen PN' is placed vertically, the electronic panel EP and the first conductive sheet CTS1 are relatively horizontally arranged in FIG. 21, and the electronic panel EP and the first conductive sheet CTS1 are tilted in FIG. 22. In addition, the pen PN' shown in FIGS. 21 and 22 does not include the cover conductor CCT (refer to FIG. 16).

Referring to FIGS. 21 and 22, an area of the magnetic flux density formed by the pen PN' may include a first magnetic flux density area MF1 around the ferrite core F-C, a second magnetic flux density area MF2 around the first magnetic flux density area MF2, a third magnetic flux density area MF3 around the second magnetic flux density area MF2, and a fourth magnetic flux density area MF4 around the third magnetic flux density area MF3. The magnetic flux density may decrease going from the first magnetic flux density area MF1 to the fourth magnetic flux density area MF4.

A distance between a side surface of the coil CO and the first conductive sheet CTS1 may be reduced when the pen PN' and the first conductive sheet CTS1 are placed vertically compared with when the pen PN' and the first conductive sheet CTS1 are tilted with respect to each other.

The first conductive sheet CTS1 may be closer to the first magnetic flux density area MF1 when the pen PN' and the first conductive sheet CTS1 are tilted with respect to each other than when the pen PN' and the first conductive sheet CTS1 are placed vertically. When viewed in the plane, the portion of the first magnetic flux density area MF1, which overlaps the first conductive sheet CTS1, may increase.

Accordingly, the magnetic flux sucked from the first magnetic flux density area MF1 to the first conductive sheet CTS1 may increase when the pen PN' and the first conductive sheet CTS1 are tilted with respect to each other compared with when the pen PN' and the first conductive sheet CTS1 are placed vertically. That is, the magnetic flux sucked from the side surface of the ferrite core F-C into the first conductive sheet CTS1 may increase. Accordingly, the inductance of the coil CO may be varied, and thus, the pen may malfunction.

In embodiments of the present disclosure, the cover conductor CCT may be used to reduce the variation in inductance. This will be described in detail below.

Figure 23:
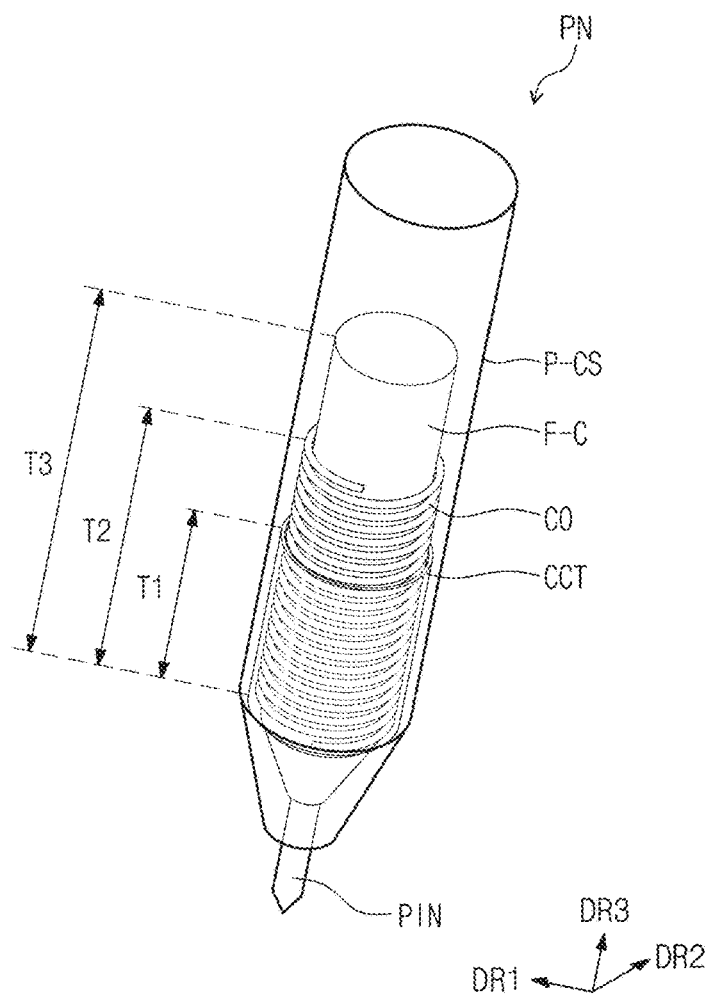
FIG. 23 is a perspective view of a ferrite core, a coil, and a cover conductor shown in FIG. 16 according to an embodiment of the present disclosure.
Figure 24:
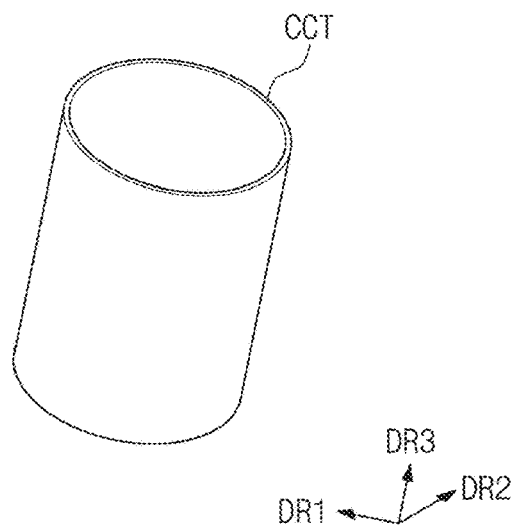
FIG. 24 is an enlarged perspective view of the cover conductor shown in FIG. 23 according to an embodiment of the present disclosure.

FIG. 23 is a perspective view of the ferrite core F-C, the coil CO, and the cover conductor CCT shown in FIG. 16 according to an embodiment of the present disclosure. FIG. 24 is an enlarged perspective view of the cover conductor CCT shown in FIG. 23 according to an embodiment of the present disclosure.

In FIG. 23, the pen case P-CS is shown transparently so that an internal structure of the pen case P-CS is visible. In addition, the cover conductor CCT is shown transparently in FIG. 23, and thus, the coil CO provided inside the pen case P-CS is also visible.

Referring to FIGS. 23 and 24, the pen PN may include the ferrite core F-C, the coil CO disposed at an outer perimeter surface of the ferrite core F-C, and the cover conductor CCT. The cover conductor CCT may cover the outside of the coil CO. For example, the cover conductor CCT may be disposed around the outside of the coil CO and may cover an outer portion of the coil CO. The coil CO may surround the outer perimeter surface of the ferrite core F-C. When viewed from the outside of the coil CO, the cover conductor CCT may overlap a portion of the coil CO.

The cover conductor CCT may have a closed-loop shape and may surround the portion of the coil CO. The closed-loop shape may refer to a configuration in which the only openings of the cover conductor CCT are formed at the ends of the cover conductor CCT, and in which the cover conductor CCT forms a continuous ring with no breaks or openings along the perimeter surface of the cover conductor CCT. As an example, the cover conductor CCT may have a ring shape when viewed in the third direction DR3 and may surround the portion of the coil CO.

The cover conductor CCT may be in a floating state. However, embodiments of the present disclosure are not limited thereto. That is, a ground voltage or a constant voltage may be applied to the cover conductor CCT. The cover conductor CCT may include a paramagnetic or diamagnetic substance. According to embodiments, the cover conductor CCT does not include a ferromagnetic substance. As an example, the cover conductor CCT may include copper. The portion of the coil CO, which is covered with the cover conductor CCT, may be at least a half of the coil CO or more. That is, the cover conductor CCT may cover at least half of the coil CO. However, a size of the portion of the coil CO covered with the cover conductor CCT is not limited thereto.

The cover conductor CCT may have a first length T1, and the coil CO may have a second length T2 longer than the first length T1 in the third direction DR3. In addition, the ferrite core F-C having the cylindrical shape may have a third length T3 longer than the second length T2 in the third direction DR3.

The cover conductor CCT may shield the magnetic flux generated from the coil CO and the side surface of the ferrite core F-C. In this case, the magnetic flux density around the coil CO and the side surface of the ferrite core F-C may be reduced when compared with that in FIG. 22. The magnetic flux density will be shown in FIG. 32.

Hereinafter, various pens will be described. Descriptions of the pens will be focused on different features from the pen PN shown in FIG. 23. In addition, when referring to FIGS. 25 to 41, for convenience of explanation, descriptions of the pens will be focused on features different from each other, the same reference numerals may denote the same elements, and a further description of components and technical aspects previously described may be omitted.

Figure 25:
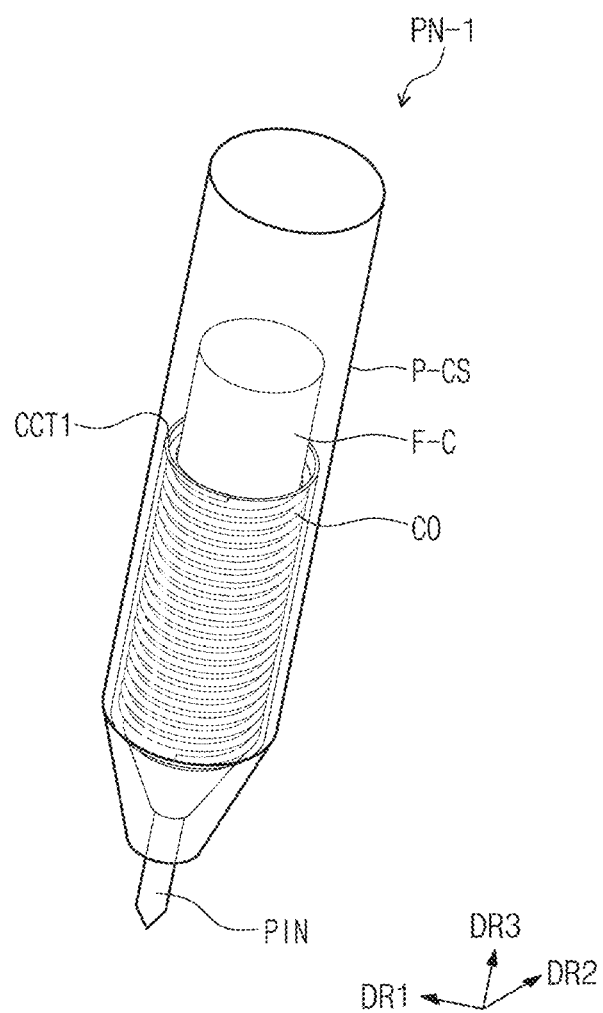
FIG. 25 is a view of a pen according to an embodiment of the present disclosure.

FIG. 25 is a view of a pen PN-1 according to an embodiment of the present disclosure.

Referring to FIG. 25, a cover conductor CCT1 of the pen PN-1 may cover the outside of a coil CO. For example, the cover conductor CCT1 of the pen PN-1 may be disposed around the outside of the coil CO and cover the outer portion of the coil CO. According to embodiments, the cover conductor CCT s may cover an entirety of the outer portion of the coil CO (see, e.g., FIG. 25), or may cover a portion less than the entirety of the outer portion of the coil CO (see, e.g., FIG. 23). That is, in an embodiment, the coil CO may be entirely covered with the cover conductor CCT1.

Figure 26:
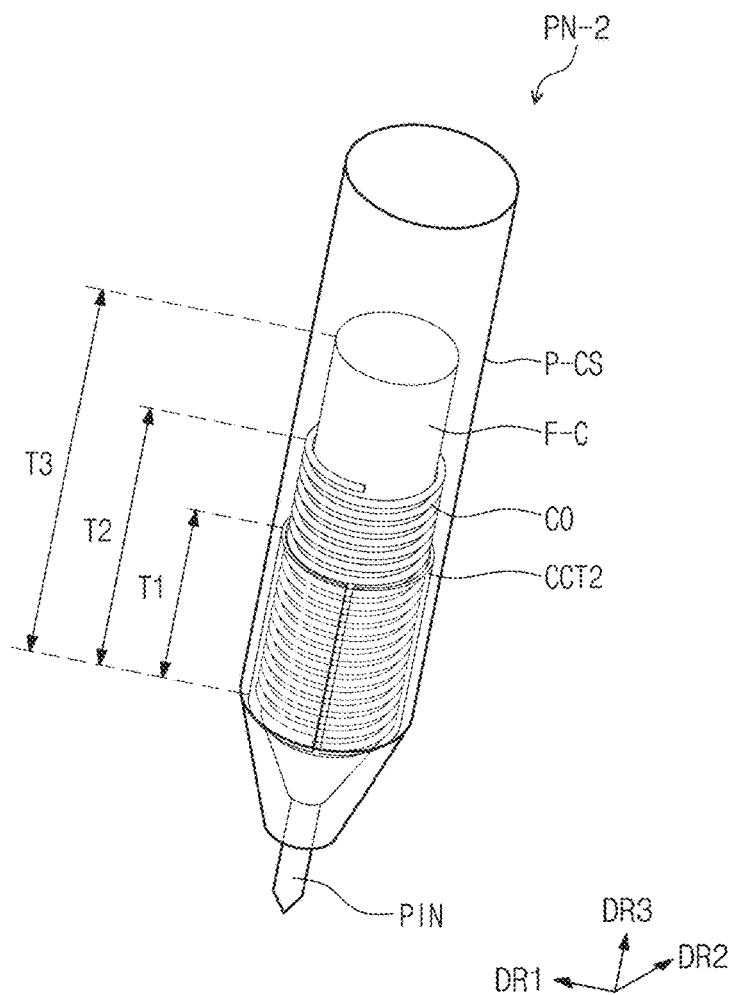
FIG. 26 is a view of a pen according to an embodiment of the present disclosure.
Figure 27:
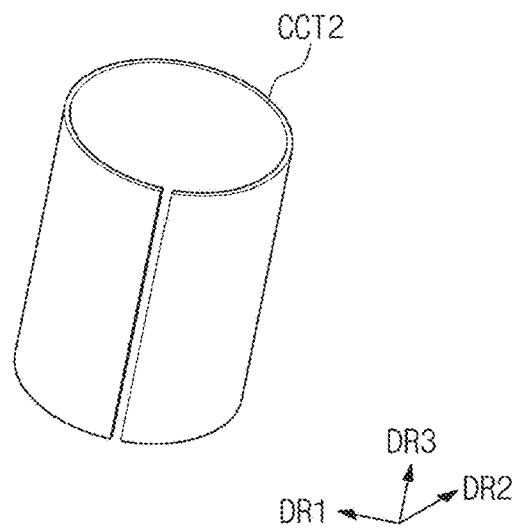
FIG. 27 is an enlarged perspective view of a cover conductor shown in FIG. 26 according to an embodiment of the present disclosure.

FIG. 26 is a view of a pen PN-2 according to an embodiment of the present disclosure. FIG. 27 is an enlarged perspective view of a cover conductor CCT2 shown in FIG. 26 according to an embodiment of the present disclosure.

Referring to FIGS. 26 and 27, the cover conductor CCT2 of the pen PN-2 may have an open-loop shape. For example, the cover conductor CCT2 may have a hollow tubular shape including an opening formed along the third direction DR3. For example, the open-loop shape may refer to a configuration in which an opening is included from one open end of the cover conductor CCT2 to the other open end of the cover conductor CCT2 along the perimeter surface of the cover conductor CCT2. As an example, a portion of the cover conductor CCT2 may be opened. When looking at the cover conductor CCT2 from the third direction DR3, a portion of a ring shape of the cover conductor CCT2 may be opened.

In the third direction DR3, the cover conductor CCT2 may have a first length T1, a coil CO may have a second length T2 longer than the first length T1, and a ferrite core F-C may have a third length T3 longer than the second length T2.

In FIG. 23, the cover conductor CCT has the closed-loop shape, and thus, an induced current may flow in a circular shape when the pen PN operates. The induced current may form a secondary magnetic field in a direction opposite to the magnetic field of the coil CO and may attenuate the magnetic field of the coil CO.

When the cover conductor CCT2 has the open-loop shape, as shown in FIG. 26, according to embodiments, the induced current does not flow through the cover conductor CCT2. Accordingly, the secondary magnetic field is not formed, and the magnetic field of the coil CO is not attenuated.

Figure 28:
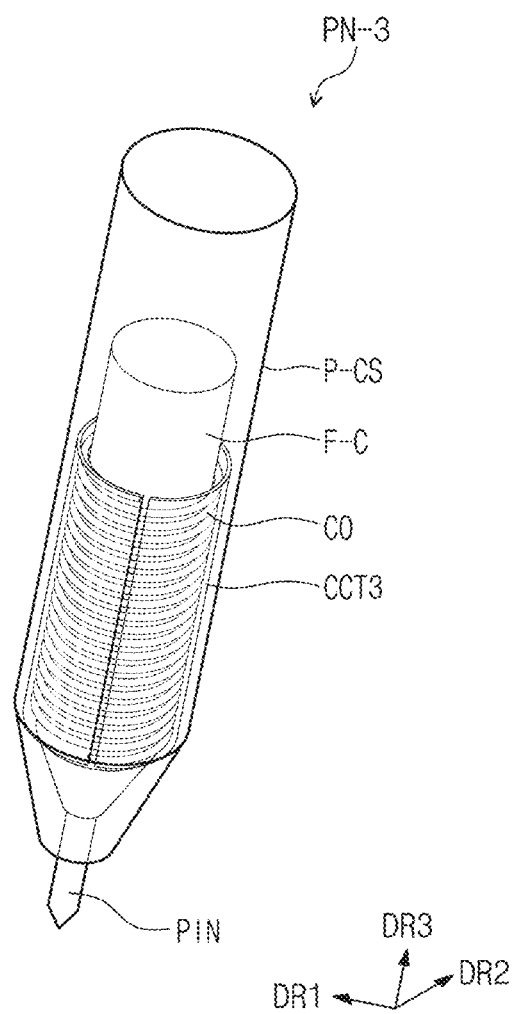
FIG. 28 is a view of a pen according to an embodiment of the present disclosure.

FIG. 28 is a view of a pen PN-3 according to an embodiment of the present disclosure.

Referring to FIG. 28, a cover conductor CCT3 of the pen PN-3 may have an open-loop shape and may cover an entire portion of the coil CO from the outside of the coil CO. That is, the cover conductor CCT3 of the pen PN-3 may be disposed around an entire outside portion of the coil CO.

Figure 29:
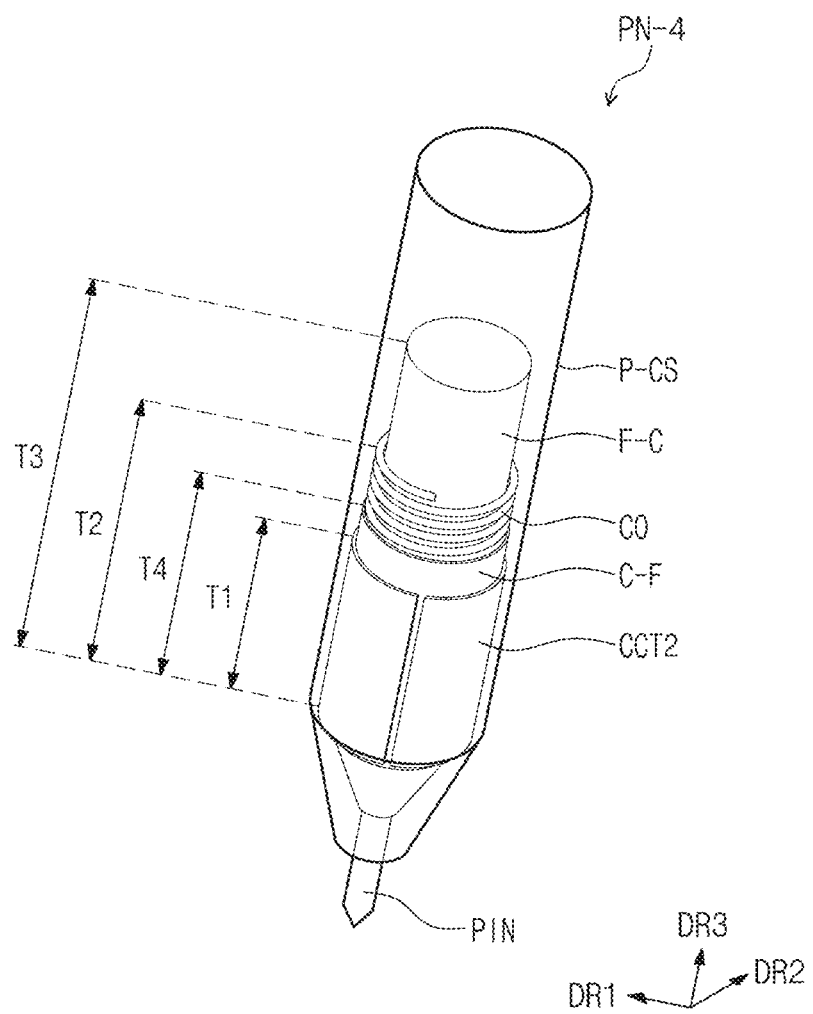
FIG. 29 is a view of a pen according to an embodiment of the present disclosure.

For convenience of illustration, referring to FIG. 29 and following figures, the portion of the coil CO that is covered is not illustrated.

Figure 30:
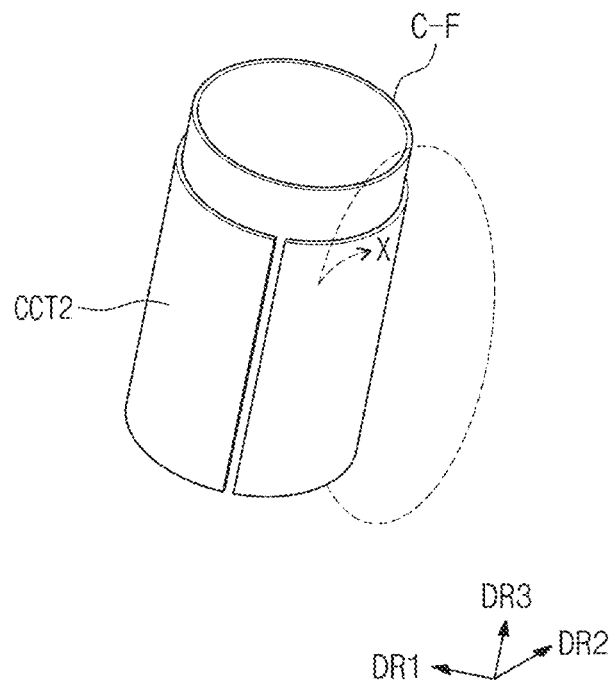
FIG. 30 is a perspective view of a cover conductor and a cover ferrite shown in FIG. 29 according to an embodiment of the present disclosure.
Figure 31:
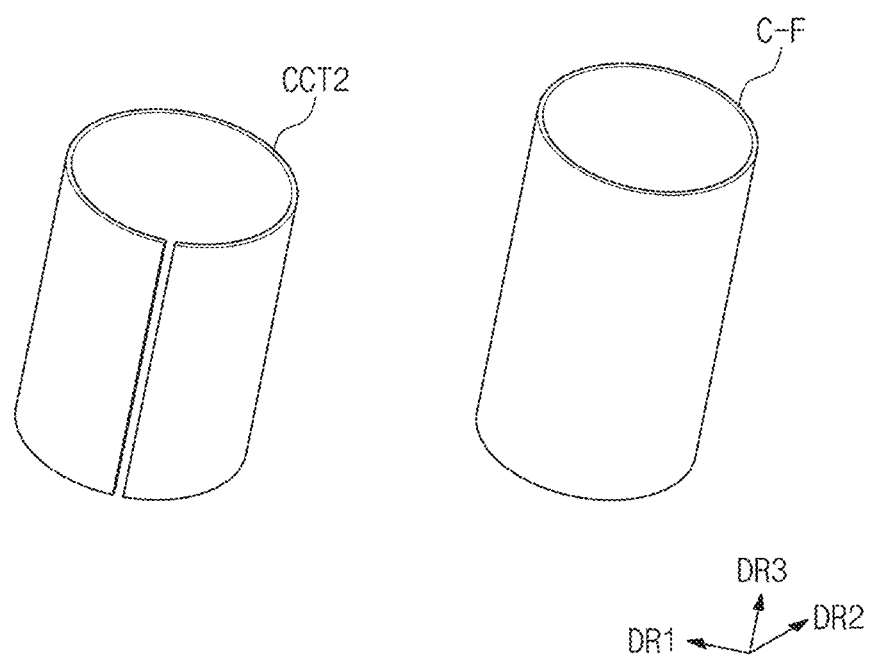
FIG. 31 is a perspective view showing the cover conductor and the cover ferrite of FIG. 30 separately according to an embodiment of the present disclosure.

FIG. 29 is a view of a pen PN-4 according to an embodiment of the present disclosure. FIG. 30 is a perspective view of a cover conductor CCT2 and a cover ferrite C-F shown in FIG. 29 according to an embodiment of the present disclosure. FIG. 31 is a perspective view separately showing the cover conductor CCT2 and the cover ferrite C-F shown in FIG. 30 according to an embodiment of the present disclosure.

Referring to FIGS. 29, 30, and 31, the pen PN-4 may further include the cover ferrite C-F disposed between the cover conductor CCT2 and a coil CO. The cover ferrite C-F may cover a portion of the coil CO. The cover ferrite C-F may include a ferromagnetic substance.

When viewed from the outside of the coil CO, the cover ferrite C-F may have an area greater than that of the cover conductor CCT2. The cover conductor CCT2 may cover a portion of the cover ferrite C-F. The cover conductor CCT2 may have an open-loop shape, and the cover ferrite C-F may have a closed-loop shape.

In the third direction DR3, the cover conductor CCT2 may have a first length T1, the coil CO may have a second length T2 longer than the first length T1, and a ferrite core F-C may have a third length T3 longer than the second length T2. In addition, the cover ferrite C-F may have a fourth length T4 longer than the first length T1 and shorter than the second length T2 in the third direction DR3.

Referring to FIG. 30, in a case in which the cover conductor CCT2 excessively shields a magnetic flux generated from the coil CO and a side surface of the ferrite core F-C, a sensing sensitivity with respect to the pen PN-4 may be reduced. However, when the cover ferrite C-F is provided, the magnetic flux (indicated by a dashed arrow) that may be shielded by the cover conductor CCT2 may be emitted along the cover ferrite C-F as shown by a dotted line.

Figure 32:
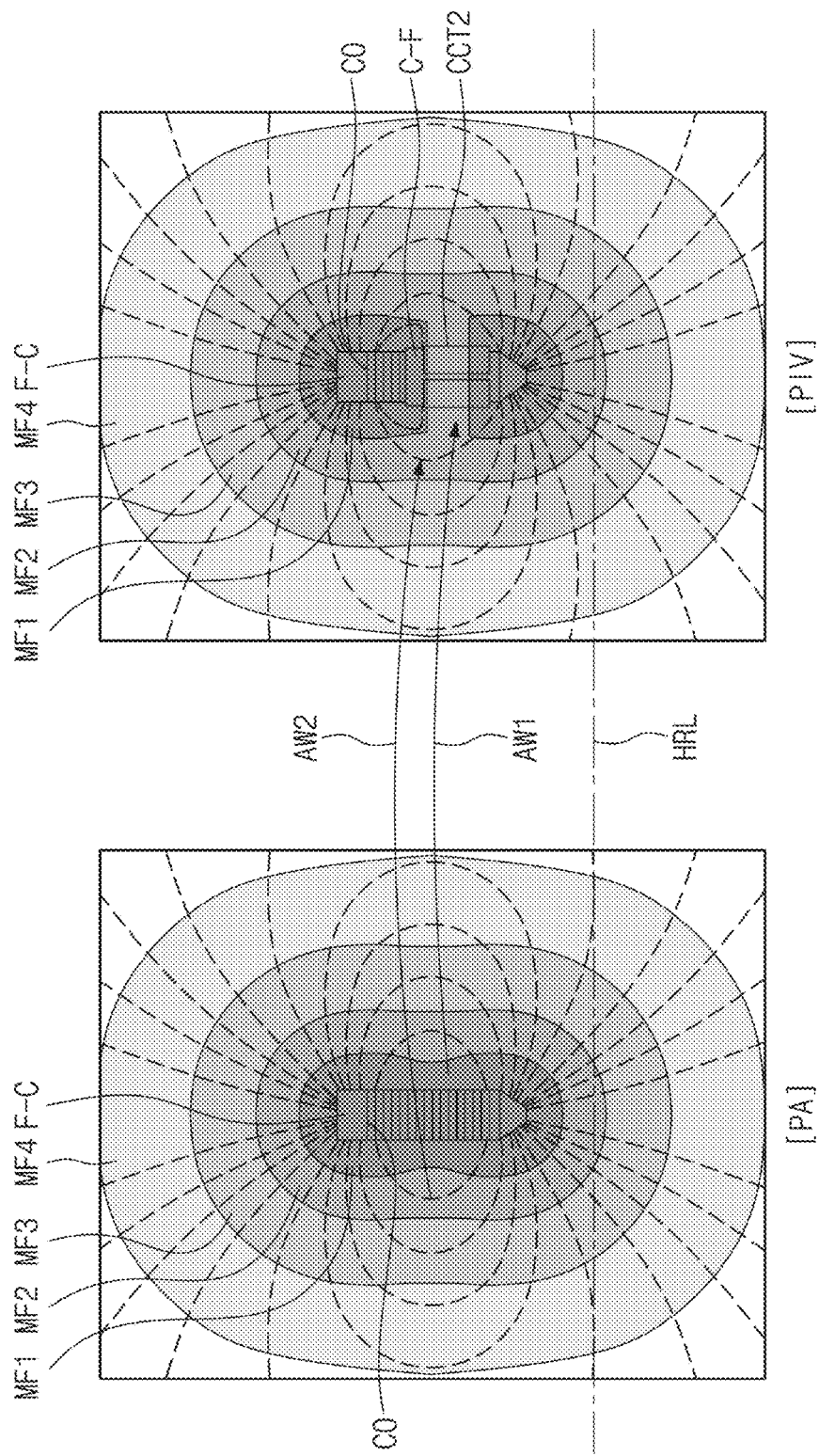
FIG. 32 is a view of a magnetic flux density around a pen that does not include a cover conductor and a magnetic flux density around the pen shown in FIG. 29.

FIG. 32 is a view of a magnetic flux density around a pen that does not include the cover conductor and a magnetic flux density around the pen shown in FIG. 29.

In FIG. 32, a left diagram PA shows the magnetic flux density around a pen that does not include the cover conductor, and a right diagram PIV shows the magnetic flux density formed by the pen PN-4 shown in FIG. 29.

Referring to FIG. 32, a first magnetic flux density area MF1 is not formed around the cover conductor CCT2 in an area indicated by a first arrow AWL. Accordingly, the magnetic flux density around the coil CO and the side surface of the ferrite core F-C may be reduced. In addition, when the cover conductor CCT2 is provided, a path of some magnetic force lines may be changed upwards as indicated by a second arrow AW2 and a horizontal reference line HRL.

Referring to FIGS. 23 and 32, since the magnetic flux density around the coil CO and the side surface of the ferrite core F-C is reduced, the magnetic flux sucked into the first conductive sheet CTS1 (refer to FIG. 23) from the ferrite core F-C does not increase even though the pen PN-4 and the first conductive sheet CTS1 (refer to FIG. 23) are tilted with respect to each other.

Figure 33:
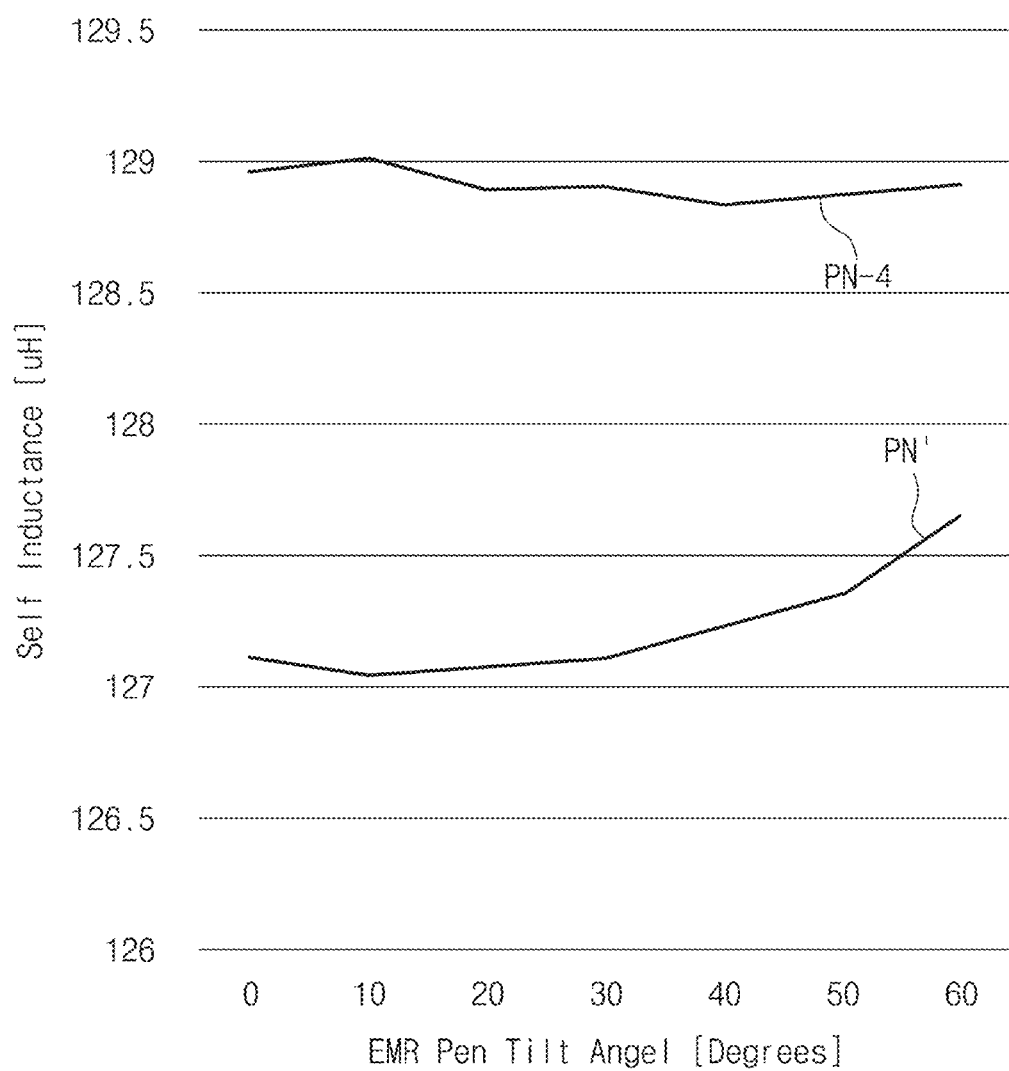
FIG. 33 is a view of a variation in inductance of structures shown in FIG. 32.

FIG. 33 is a view of a variation in inductance of structures shown in FIG. 32.

In FIG. 33, a vertical axis represents a self-inductance, and a horizontal axis represents a tilt angle of a pen.

Referring to FIG. 33, a self-inductance of the pen PN' that does not include the cover conductor CCT may increase as the pen PN' is tilted. Accordingly, a change rate in the self-inductance of the pen PN' that does not include the cover conductor CCT2 may increase.

Although the pen PN-4 is tilted, the self-inductance of the pen PN-4 that includes the cover conductor CCT2 is not changed significantly according to embodiments of the present disclosure. The change rate in the self-inductance of the pen PN-4 may be smaller than the change rate in the self-inductance of the pen PN'. Since the change rate in inductance of the coil CO is reduced, the change rate of the resonant frequency may also be reduced. Accordingly, although the pen PN-4 is tilted, a sensing accuracy for the pen PN-4 is increased, and thus a malfunction of the pen PN-4 may be prevented.

Figure 34:
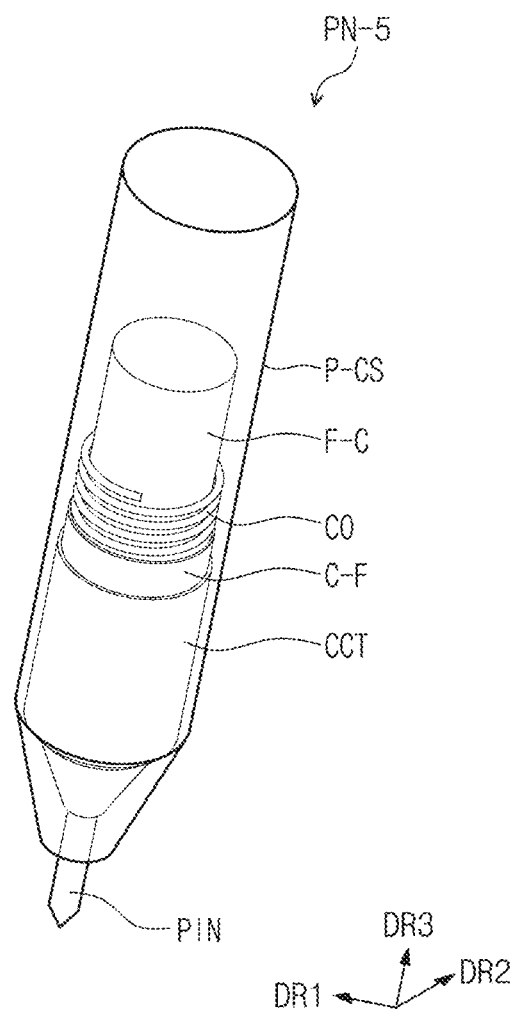
FIG. 34 is a view of a pen according to an embodiment of the present disclosure.

FIG. 34 is a view of a pen PN-5 according to an embodiment of the present disclosure.

Referring to FIG. 34, a cover conductor CCT of the pen PN-5 may have a closed-loop shape and may cover a portion of a cover ferrite C-F. The cover conductor CCT2 shown in FIG. 29 may have the open-loop shape, and the cover conductor CCT shown in FIG. 34 may have a closed-loop shape. The cover ferrite C-F, a coil CO, and a ferrite core F-C may have substantially the same structure and function as those of FIG. 29.

Figure 35:
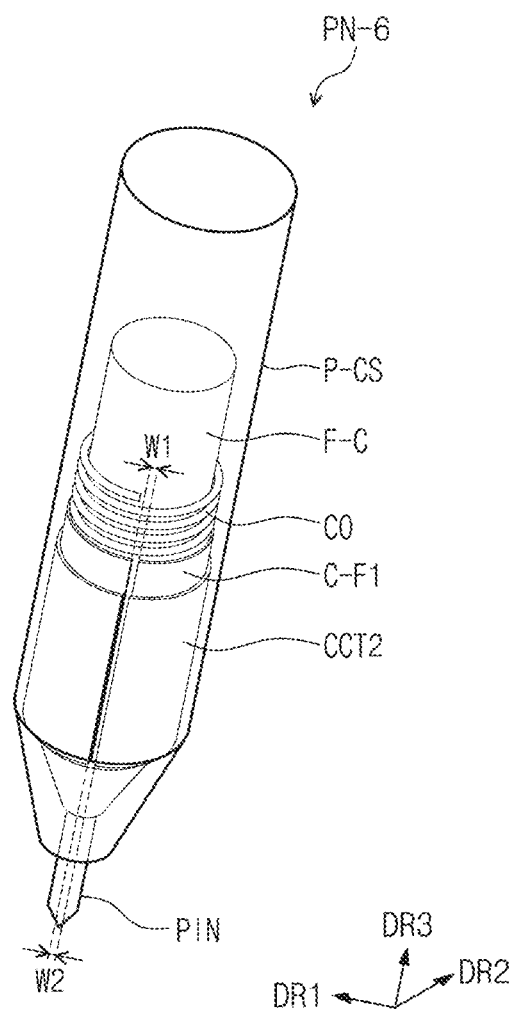
FIG. 35 is a view of a pen according to an embodiment of the present disclosure.

FIG. 35 is a view of a pen PN-6 according to an embodiment of the present disclosure.

Referring to FIG. 35, a cover conductor CCT2 and a cover ferrite C-F1 of the pen PN-6 may have an open-loop shape. In FIG. 29, the cover conductor CCT2 has the open-loop shape, and the cover ferrite C-F has the closed-loop shape. However, different from configurations shown in FIG. 29, the cover conductor CCT2 and the cover ferrite C-F1 shown in FIG. 35 may have the open-loop shape.

An opened area of the cover conductor CCT2 may have a first width W1, and an opened area of the cover ferrite C-F1 may have a second width W2. As an example, the first width W1 may be about equal to the second width W2. However, embodiments of the present disclosure are not limited thereto. For example, according to embodiments, the first width W1 and the second width W2 may be different from each other.

Figure 36:
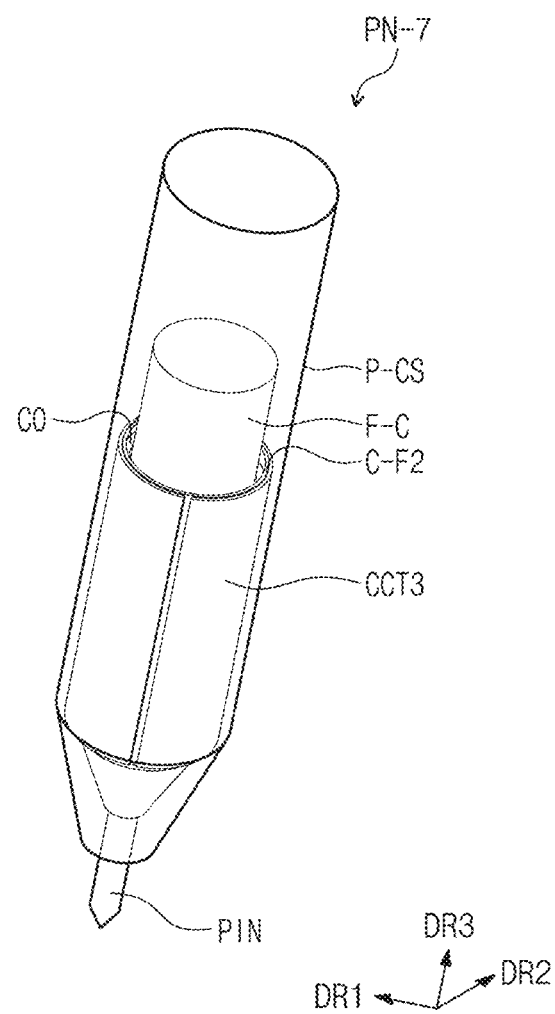
FIG. 36 is a view of a pen according to an embodiment of the present disclosure.

FIG. 36 is a view of a pen PN-7 according to an embodiment of the present disclosure.

Referring to FIG. 36, a cover conductor CCT3 and a cover ferrite C-F2 of the pen PN-7 may have substantially the same size as each other and may overlap each other when viewed from the outside of a coil CO. The cover conductor CCT3 may have an open-loop shape, and the cover ferrite C-F2 may have a closed-loop shape. The cover conductor CCT3 and the cover ferrite C-F2 may entirely cover the coil CO.

Figure 37:
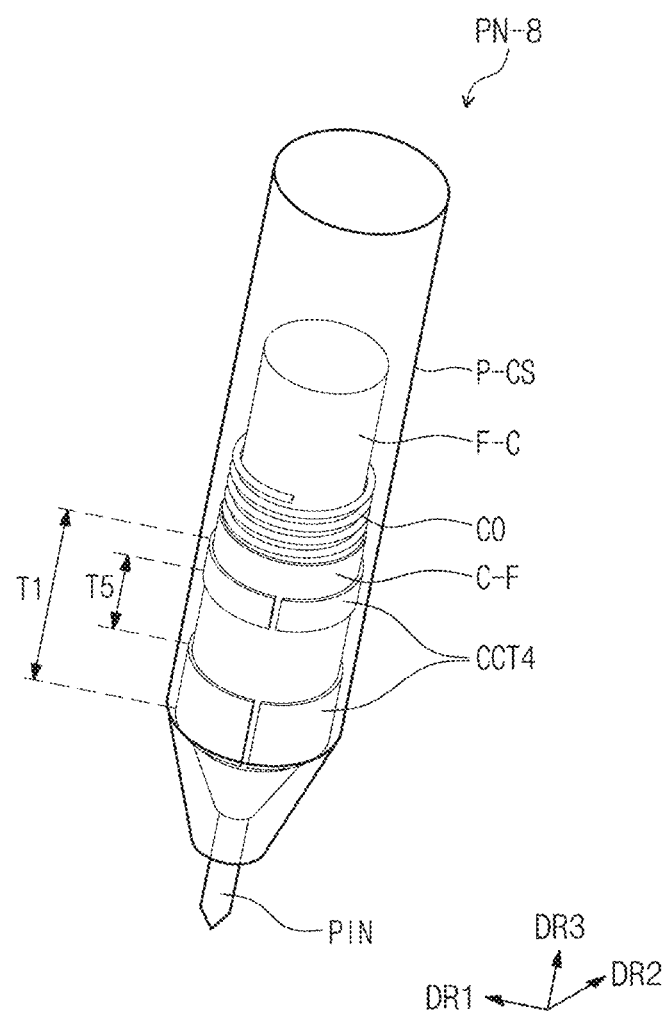
FIG. 37 is a view of a pen according to an embodiment of the present disclosure.

FIG. 37 is a view of a pen PN-8 according to an embodiment of the present disclosure.

Referring to FIG. 37, the pen PN-8 may include a plurality of cover conductors CCT4. The cover conductors CCT4 may have an open-loop shape and may surround portions of a cover ferrite C-F having a closed-loop shape.

In the third direction DR3, a distance between an upper end of the cover conductor CCT4 disposed at an upper portion and a lower end of the cover conductor CCT4 disposed at a lower portion may be set to a first length T1. An opened area between the cover conductors CCT4 may have a fifth length T5 in the third direction DR3.

Figure 38:
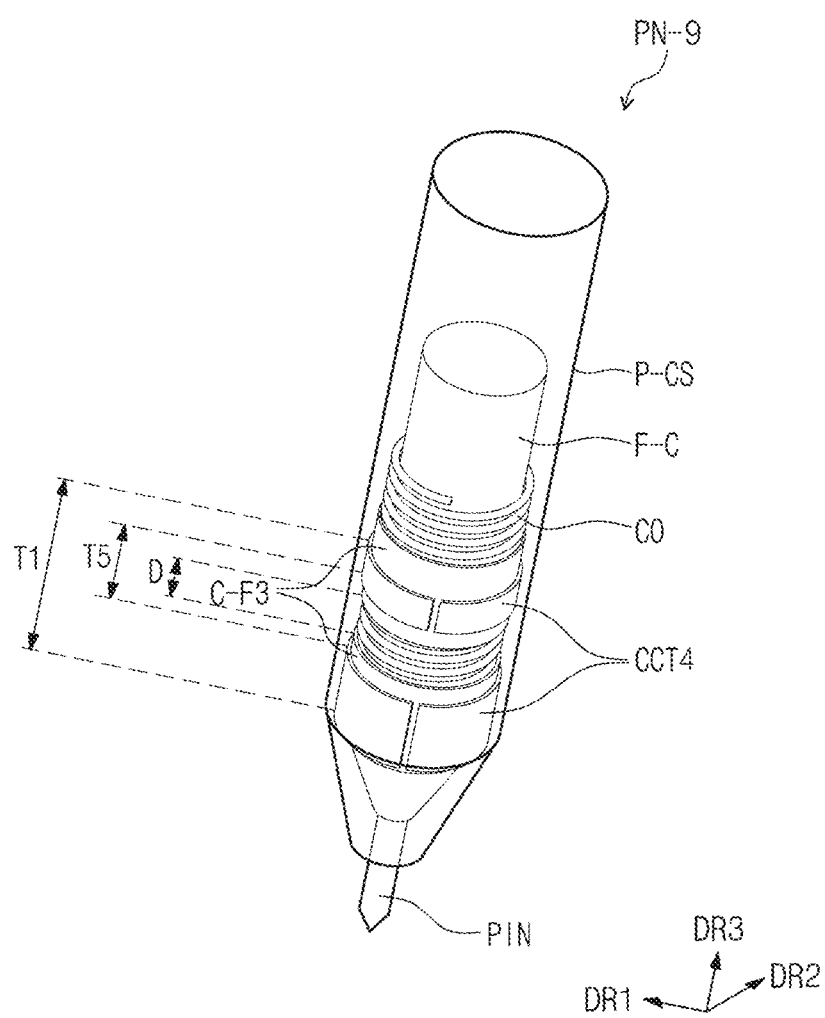
FIG. 38 is a view of a pen according to an embodiment of the present disclosure.

FIG. 38 is a view of a pen PN-9 according to an embodiment of the present disclosure.

Referring to FIG. 38, the pen PN-9 may include a plurality of cover conductors CCT4 and a plurality of cover ferrites C-F3. The cover conductors CCT4 may have an open-loop shape and may respectively surround the cover ferrites C-F3. The cover ferrites C-F3 may have a closed-loop shape. The cover ferrites C-F3 may be spaced apart from each other by a predetermined distance D in the third direction DR3.

Figure 39:
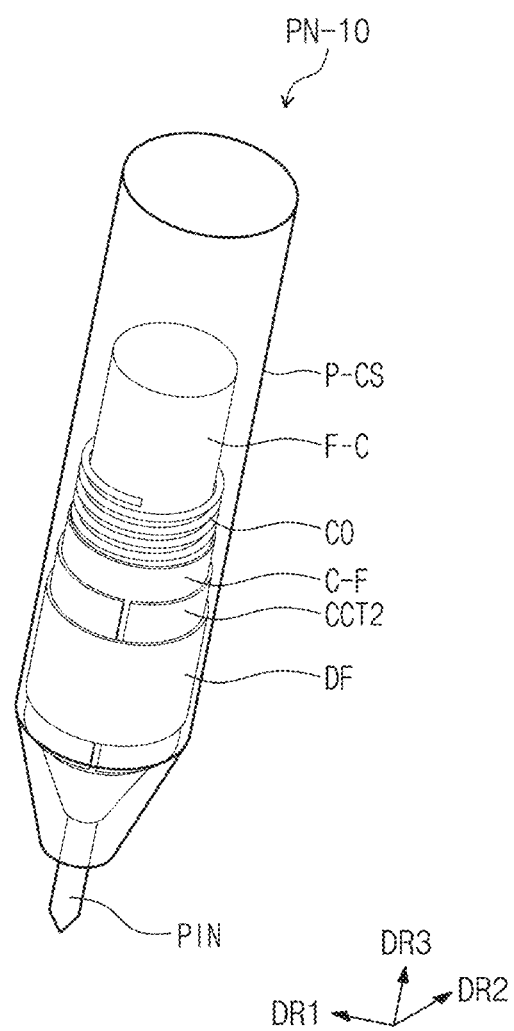
FIG. 39 is a view of a pen according to an embodiment of the present disclosure.
Figure 40:
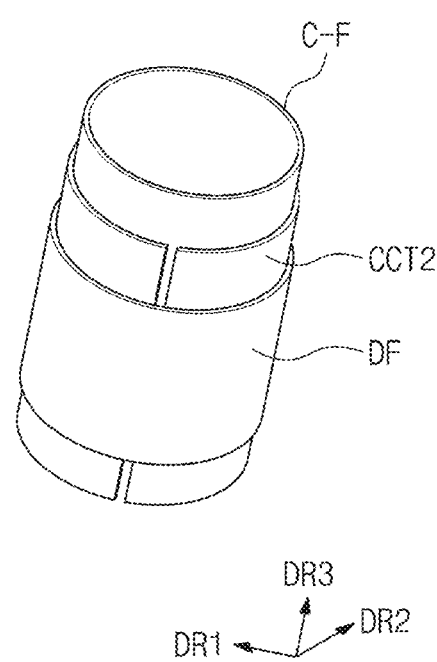
FIG. 40 is a perspective view of a cover ferrite, a cover conductor, and a dummy ferrite shown in FIG. 39 according to an embodiment of the present disclosure.

FIG. 39 is a view of a pen PN-10 according to an embodiment of the present disclosure. FIG. 40 is a perspective view of a cover ferrite, a cover conductor, and a dummy ferrite shown in FIG. 39 according to an embodiment of the present disclosure.

Referring to FIGS. 39 and 40, the pen PN-10 may further include a dummy ferrite DF surrounding the outside of the cover conductor CCT2. The dummy ferrite DF may include a magnetic permeability different from that of the cover ferrite C-F. The dummy ferrite DF may have a closed-loop shape.

Figure 41:
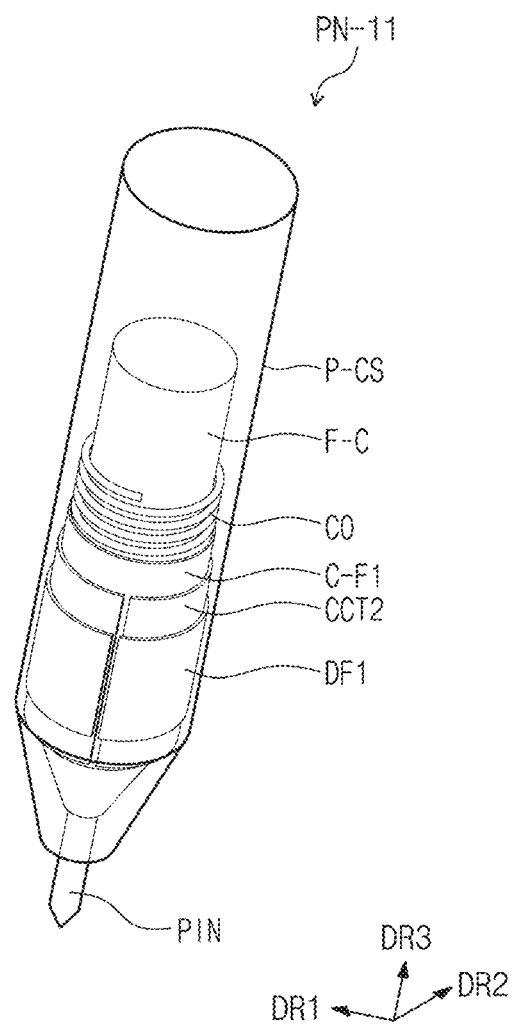
FIG. 41 is a view of a pen according to an embodiment of the present disclosure.

FIG. 41 is a view of a pen PN-11 according to an embodiment of the present disclosure.

Referring to FIG. 41, a dummy ferrite DF1 of the pen PN-11 may have an open-loop shape.

As is traditional in the field of the present disclosure, embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, etc., which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions.

While the present disclosure has been particularly shown and described with reference to embodiments thereof, it will be understood by those of ordinary skill in the art that various changes in form and detail may be made therein without departing from the spirit and scope of the present disclosure as defined by the following claims.

What is claimed is:

1. A display device, comprising:
 a display panel;
 an input sensing part disposed on the display panel; and
 a pen, comprising:
  a ferrite core;
  a coil disposed on an outer perimeter surface of the ferrite core;
  a capacitor connected to the coil;
  a cover conductor covering an outer portion of the coil, wherein the cover conductor is in a floating state; and
  a cover ferrite disposed between the cover conductor and the coil.

2. The display device of claim 1, wherein the cover conductor comprises a paramagnetic substance or a diamagnetic substance.

3. The display device of claim 1, wherein the cover conductor has a closed-loop shape.

4. The display device of claim 1, wherein the cover conductor covers at least half of the outer portion of the coil.

5. The display device of claim 1, wherein the cover conductor covers an entirety of the outer portion of the coil.

6. The display device of claim 1, wherein the cover conductor has an open-loop shape.

7. The display device of claim 1, wherein an area of the cover ferrite is greater than an area of the cover conductor.

8. The display device of claim 1, wherein the cover ferrite has a closed-loop shape.

9. The display device of claim 1, wherein the cover ferrite has an open-loop shape.

10. The display device of claim 1, wherein an area of the cover conductor and an area of the cover ferrite are about equal.

11. The display device of claim 1, wherein the cover conductor is one of a plurality of cover conductors.

12. The display device of claim 11, wherein the cover ferrite is one of a plurality of cover ferrites.

13. The display device of claim 1, further comprising:
 a dummy ferrite surrounding an outer portion of the cover conductor.

14. The display device of claim 13, wherein a magnetic permeability of the dummy ferrite is different from a magnetic permeability of the cover ferrite.

15. The display device of claim 13, wherein the dummy ferrite has a closed-loop shape.

16. The display device of claim 13, wherein the dummy ferrite has an open-loop shape.

17. The display device of claim 1, wherein the input sensing part comprises:
 a first sensing electrode extending in a first direction;
 a second sensing electrode extending in a second direction crossing the first direction and insulated from the first sensing electrode while crossing the first sensing electrode;
 a first pen sensing electrode extending in the first direction and insulated from the second sensing electrode while crossing the second sensing electrode; and
 a second pen sensing electrode extending in the second direction and insulated from the first sensing electrode and the first pen sensing electrode while crossing the first sensing electrode and the first pen sensing electrode,
 wherein the first and second sensing electrodes and the first and second pen sensing electrodes are disposed on a same layer.

18. The display device of claim 17, wherein the first sensing electrode comprises a first-first sensing electrode and a first-second sensing electrode symmetrical with the first-first sensing electrode,
 wherein the second sensing electrode comprises a second-first sensing electrode and a second-second sensing electrode symmetrical with the second-first sensing electrode, and
 wherein the first pen sensing electrode is disposed between the first-first sensing electrode and the first-second sensing electrode, and the second pen sensing electrode is disposed between the second-first sensing electrode and the second-second sensing electrode.

19. A pen, comprising:
   a ferrite core;
   a coil disposed on an outer perimeter surface of the ferrite core;
   a capacitor connected to the coil;
   a cover conductor covering a portion of the coil, wherein the cover conductor has an open-loop shape,
   wherein the cover conductor is in a floating state; and
   a cover ferrite disposed between the cover conductor and the coil.

20. An electronic device, comprising:
   a display panel;
   an input sensing part comprising:
      a first sensing electrode;
      a second sensing electrode insulated from the first sensing electrode while crossing the first sensing electrode;
      a first pen sensing electrode; and
      a second pen sensing electrode insulated from the first pen sensing electrode while crossing the first pen sensing electrode; and
   a pen, comprising:
      a ferrite core;
      a coil disposed on an outer perimeter surface of the ferrite core;
      a capacitor connected to the coil; and
      a cover conductor covering an outer portion of the coil,
   wherein the first and second sensing electrodes and the first and second pen sensing electrodes are disposed on a same layer, and the cover conductor has an open-loop shape, and
   wherein the cover conductor is in a floating state.

* * * * *